(12) United States Patent
Yang

(10) Patent No.: US 9,970,687 B2
(45) Date of Patent: May 15, 2018

(54) HEAT-DISSIPATING STRUCTURE HAVING EMBEDDED SUPPORT TUBE TO FORM INTERNALLY RECYCLING HEAT TRANSFER FLUID AND APPLICATION APPARATUS

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 885 days.

(21) Appl. No.: 13/927,220

(22) Filed: Jun. 26, 2013

(65) Prior Publication Data
US 2015/0000875 A1 Jan. 1, 2015

(51) Int. Cl.
| | |
|---|---|
| *F24J 3/08* | (2006.01) |
| *F28D 15/00* | (2006.01) |
| *F28D 15/02* | (2006.01) |
| *F28D 20/00* | (2006.01) |
| *F28D 1/053* | (2006.01) |
| *F03D 1/00* | (2006.01) |
| *H02S 40/42* | (2014.01) |

(Continued)

(52) U.S. Cl.
CPC ............ *F24J 3/084* (2013.01); *F03D 1/00* (2013.01); *F28D 1/053* (2013.01); *F28D 15/00* (2013.01); *F28D 15/025* (2013.01); *F28D 15/0266* (2013.01); *F28D 20/0052* (2013.01); *H02S 40/42* (2014.12); *F05B 2260/208* (2013.01); *F21S 8/08* (2013.01); *F21V 29/30* (2013.01); *F24J 3/082* (2013.01); *F28D 1/04* (2013.01); *F28D 7/12* (2013.01); *F28D 2021/0028* (2013.01); *H01F 27/10* (2013.01); *Y02E 10/125* (2013.01); *Y02E 10/72* (2013.01); *Y02E 60/142* (2013.01); *Y02E 70/30* (2013.01)

(58) Field of Classification Search
CPC .......... F24J 3/084; F28D 20/0052; F28D 7/12
USPC ......................................................... 165/45
See application file for complete search history.

(56) References Cited

U.S. PATENT DOCUMENTS

| 4,116,379 A | * | 9/1978 | Movick ................. F24D 11/003 |
| | | | 126/400 |
| 4,205,718 A | * | 6/1980 | Balch .................. F24D 11/0221 |
| | | | 126/400 |

(Continued)

FOREIGN PATENT DOCUMENTS

| CN | 102141237 A | * | 2/2010 |
| CN | 103062736 A | * | 4/2013 |

(Continued)

*Primary Examiner* — Devon Russell
(74) *Attorney, Agent, or Firm* — Bacon & Thomas, PLLC

(57) ABSTRACT

The invention is provided with a support tube (101) and an inner tube (103) installed inside thereof, the diameter differentiation between the inner diameter of the support tube (101) and the outer diameter of the inner tube (103) is formed with a partitioned space for constituting a fluid path, the upper tube of the support tube (101) is installed with an electric energy application device assembly (108), and through the fluid pump (105) serially installed on the heat transfer fluid path to pump the heat transfer fluid to form a closed recycling flow, and through passing the support tube (101) of the mentioned closed recycling heat transfer fluid path and the exposed portion at the outer surface of the relevant structure, thereby enabling to perform temperature equalizing operation with the external gaseous or solid or liquid environment and/or the soil or liquid of the shallow ground natural thermal energy body.

44 Claims, 14 Drawing Sheets

(51) Int. Cl.
  *F28D 21/00* (2006.01)
  *F28D 7/12* (2006.01)
  *F21V 29/00* (2015.01)
  *F21S 8/08* (2006.01)
  *F28D 1/04* (2006.01)
  *H01F 27/10* (2006.01)

(56) References Cited

U.S. PATENT DOCUMENTS

| | | | | |
|---|---|---|---|---|
| 4,252,185 A | * | 2/1981 | Kosson | F24J 2/32 |
| | | | | 122/33 |
| 4,444,249 A | * | 4/1984 | Cady | F28D 15/0233 |
| | | | | 126/629 |
| 4,445,499 A | * | 5/1984 | Platell | F24J 3/084 |
| | | | | 126/400 |
| 4,566,532 A | * | 1/1986 | Basmajian | F24J 3/085 |
| | | | | 165/108 |
| 4,961,463 A | * | 10/1990 | DenHartog | E02D 3/115 |
| | | | | 165/104.21 |
| 4,995,450 A | * | 2/1991 | Geppelt | F28D 15/0233 |
| | | | | 119/73 |
| 5,178,485 A | * | 1/1993 | Katsuragi | E01C 11/26 |
| | | | | 165/45 |
| 5,190,098 A | * | 3/1993 | Long | E02D 3/115 |
| | | | | 165/104.22 |
| 7,624,789 B2 | * | 12/2009 | Minamitani | G06F 1/203 |
| | | | | 165/104.33 |
| 7,755,715 B2 | * | 7/2010 | Kimura | G02F 1/133603 |
| | | | | 349/161 |
| 8,088,345 B2 | * | 1/2012 | Caro | B01F 5/0646 |
| | | | | 208/132 |
| 8,991,488 B2 | * | 3/2015 | Loveday | E21B 36/003 |
| | | | | 166/242.1 |
| 2007/0271940 A1 | * | 11/2007 | Yang | F24J 3/06 |
| | | | | 62/260 |
| 2008/0210402 A1 | * | 9/2008 | Kidwell | F24J 3/084 |
| | | | | 165/45 |
| 2008/0289795 A1 | * | 11/2008 | Hardin | F24J 3/083 |
| | | | | 165/45 |
| 2010/0305918 A1 | * | 12/2010 | Udell | F24J 3/081 |
| | | | | 703/2 |
| 2010/0314070 A1 | * | 12/2010 | Yang | F24J 3/083 |
| | | | | 165/45 |
| 2011/0037390 A1 | * | 2/2011 | Ko | F21V 29/02 |
| | | | | 315/117 |
| 2011/0094719 A1 | * | 4/2011 | Yang | F24J 3/082 |
| | | | | 165/157 |
| 2012/0097361 A1 | * | 4/2012 | Yang | F28D 15/00 |
| | | | | 165/45 |
| 2013/0068418 A1 | * | 3/2013 | Gotland | F24J 3/08 |
| | | | | 165/45 |

FOREIGN PATENT DOCUMENTS

| | | | | |
|---|---|---|---|---|
| CN | 103438385 A | * | 12/2013 | |
| GB | 2058334 A | * | 4/1981 | F24J 3/083 |
| WO | WO201025640 A2 | * | 8/2012 | |

* cited by examiner

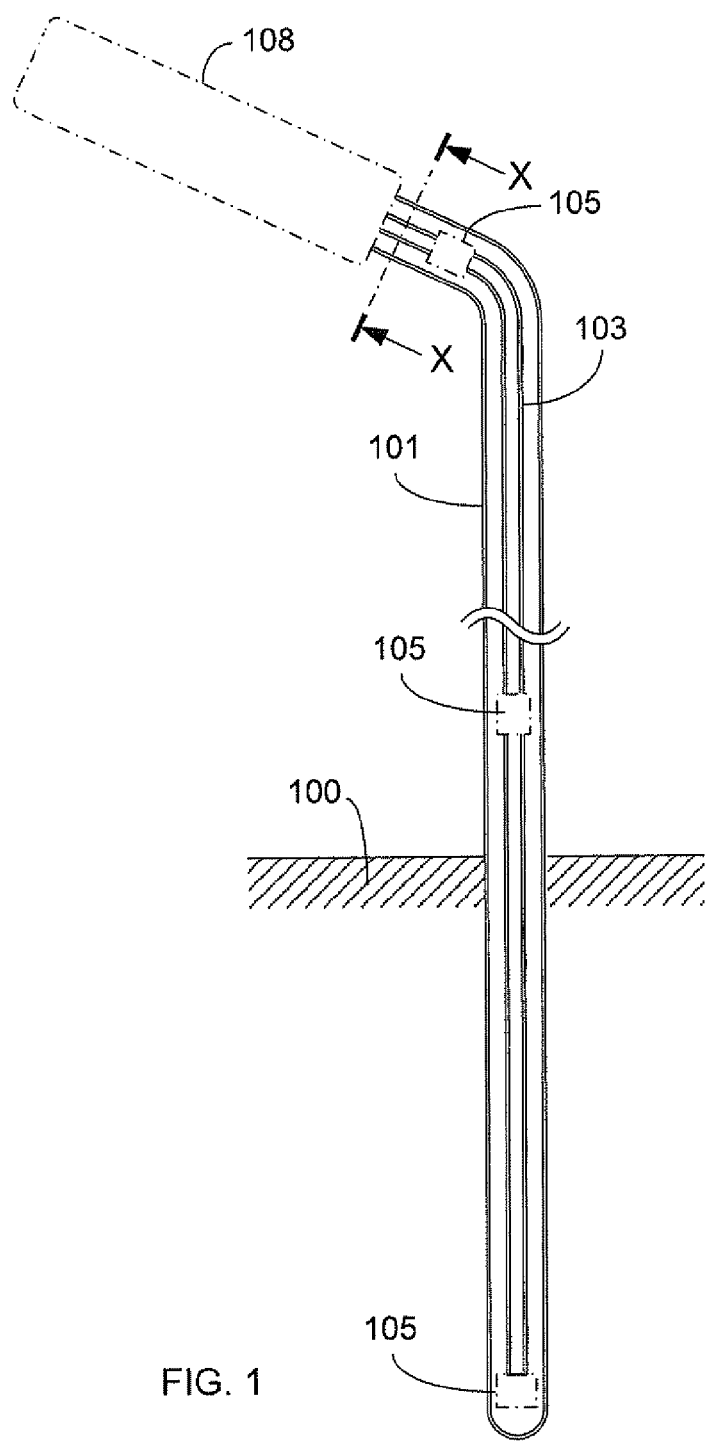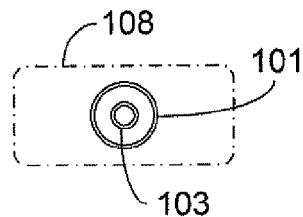
FIG. 1
FIG. 2

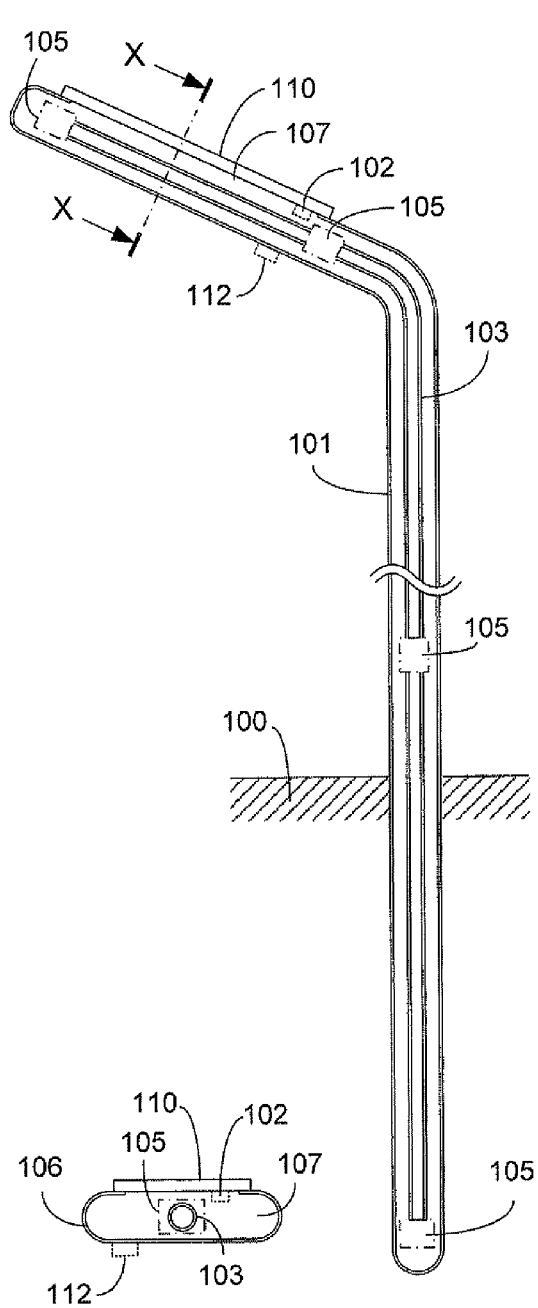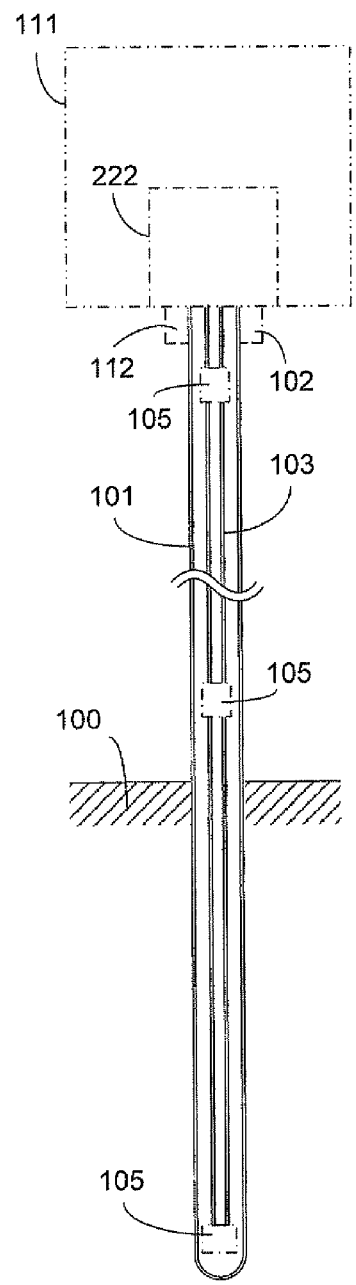
FIG. 8　　FIG. 7　　FIG. 9

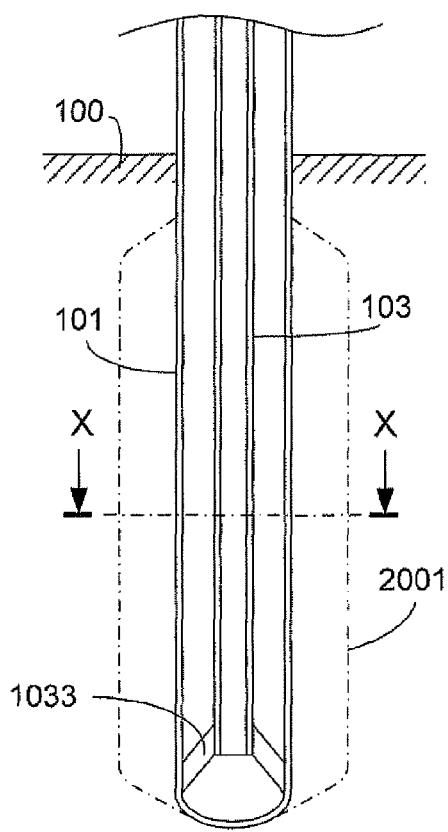
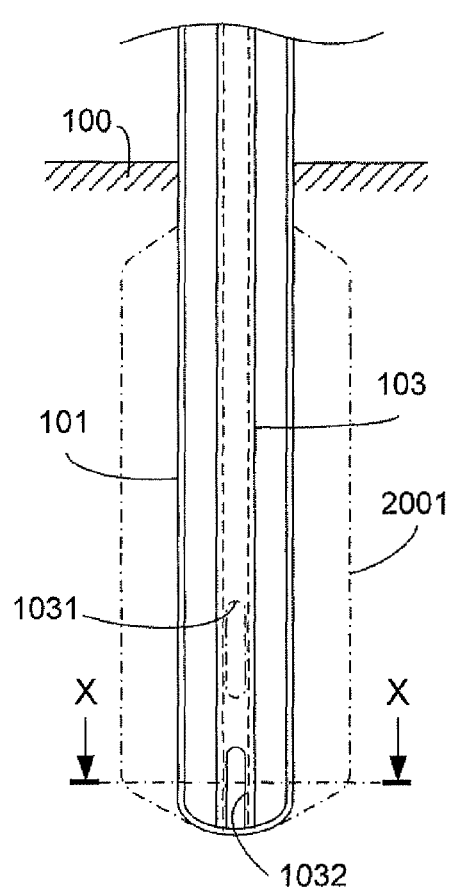
FIG. 13   FIG. 15
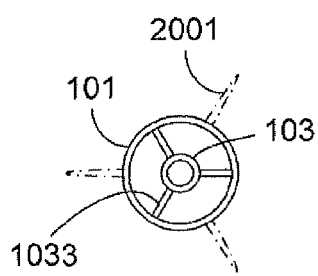
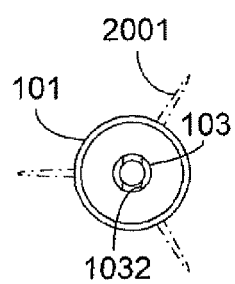
FIG. 14   FIG. 16

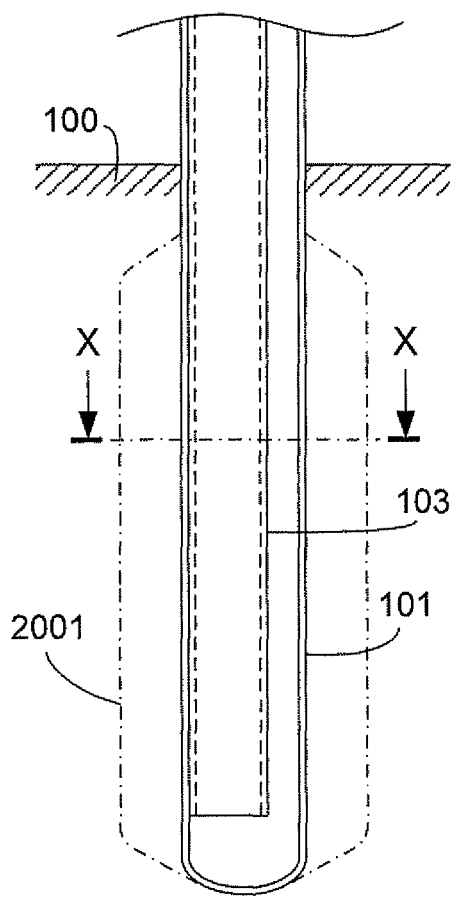
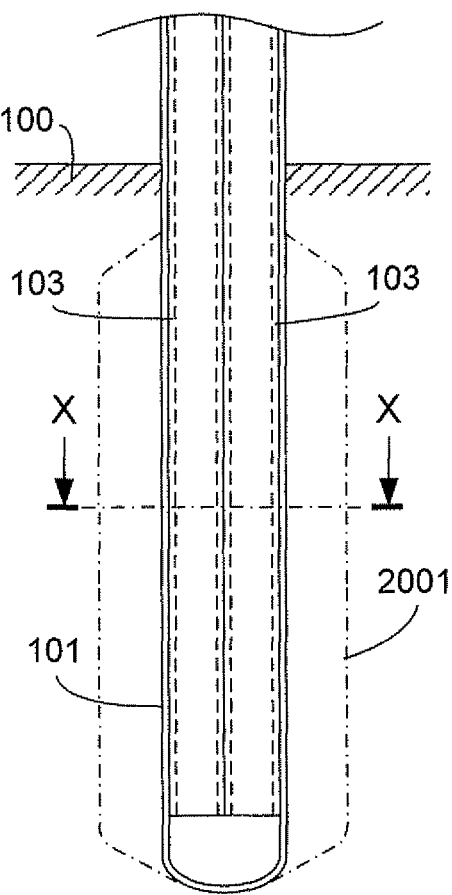
FIG. 17  FIG. 19
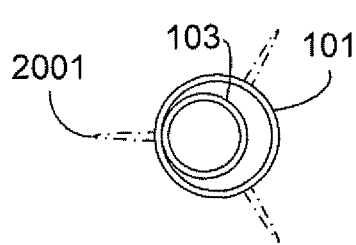
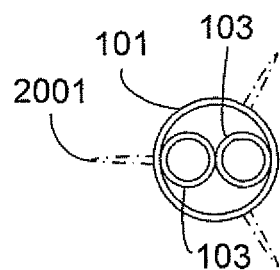
FIG. 18  FIG. 20

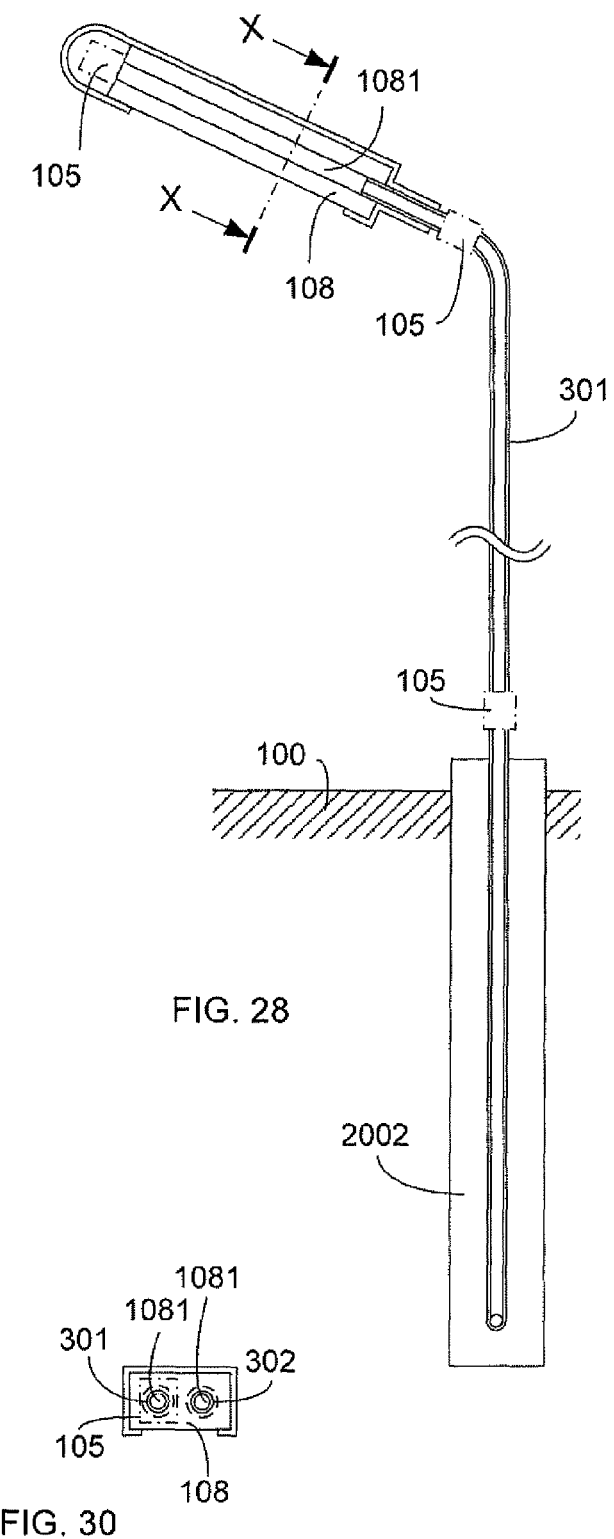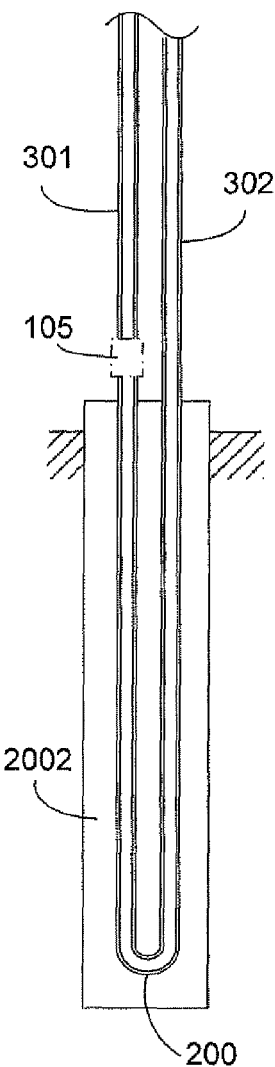
FIG. 28
FIG. 30
FIG. 29

HEAT-DISSIPATING STRUCTURE HAVING EMBEDDED SUPPORT TUBE TO FORM INTERNALLY RECYCLING HEAT TRANSFER FLUID AND APPLICATION APPARATUS

BACKGROUND OF THE INVENTION (a) Field of the Invention

The present invention provides a heat-dissipating structure having embedded support tube to form internally recycling heat transfer fluid and application apparatus, which is installed in the ground soil or liquid of a shallow ground natural thermal energy body for performing temperature equalizing operation with the external gaseous or solid or liquid environment and/or the soil or liquid of the shallow ground natural thermal energy body, the interior of a support tube (101) is installed with an inner tube (103) for being penetrated through, the inner diameter of the support tube (101) is greater than the outer diameter of the inner tube (103), the partitioned space formed through the diameter differentiation allows a fluid path to be formed, the distal end of the support tube (101) is sealed, the distal end of the inner tube (103) is shorter than the distal end of the support tube (101) or preformed with fluid holes, the distal ends of both tubes are formed with a flow returning segment allowing the heat transfer fluid to be returned;

The front tube port of the support tube (101) and the front tube port of the inner tube (103) allow the heat transfer fluid passing an electric energy application device assembly (108) and/or a heat dissipater thereof to be transferred, wherein one of the tube ports allows the heat transfer fluid to be transferred for passing the electric energy application device assembly (108) and/or the heat dissipater thereof, and the other tube port allows the heat transfer fluid which already passed the electric energy application device assembly (108) and/or the heat dissipater thereof to be returned;

One or more than one of fluid pumps (105) are serially installed on the mentioned closed recycling heat transfer fluid path, the flowing direction thereof can be selected from one flowing direction or two flowing directions enabled to be switched or periodically changed;

The gaseous or liquid heat transfer fluid pumped by the fluid pump (105) passes the support tube (101) of the closed recycling heat transfer fluid path and the exposed portion of the relevant structure, thereby enabling to perform temperature equalizing operation with the external gaseous or solid or liquid environment and/or the soil or liquid of the shallow ground natural thermal energy body.

(b) Description of the Prior Art

A conventional electric energy application device assembly, e.g. an illumination device utilizing electric energy being converted into photo energy, an illumination device adopting LED, a photovoltaic, a wind power generator, a transformer or a motor, generates thermal energy while being operated, so over-heating prevention or anti-freezing for the mentioned assembly is very important.

SUMMARY OF THE INVENTION

The present invention provides a heat-dissipating structure having embedded support tube to form internally recycling heat transfer fluid and application apparatus, which is installed in the ground soil or liquid of a shallow ground natural thermal energy body for performing temperature equalizing operation with the external gaseous or solid or liquid environment and/or the soil or liquid of the shallow ground natural thermal energy body, the interior of a support tube (101) is installed with an inner tube (103) for being penetrated through, the inner diameter of the support tube (101) is greater than the outer diameter of the inner tube (103), the partitioned space formed through the diameter differentiation allows a fluid path to be formed, the distal end of the support tube (101) is sealed, the distal end of the inner tube (103) is shorter than the distal end of the support tube (101) or preformed with fluid holes, the distal ends of both tubes are formed with a flow returning segment allowing the heat transfer fluid to be returned;

The front tube port of the support tube (101) and the front tube port of the inner tube (103) allow the heat transfer fluid passing an electric energy application device assembly (108) and/or a heat dissipater thereof to be transferred, wherein one of the tube ports allows the heat transfer fluid to be transferred for passing the electric energy application device assembly (108) and/or the heat dissipater thereof, and the other tube port allows the heat transfer fluid which already passed the electric energy application device assembly (108) and/or the heat dissipater thereof to be returned;

One or more than one of fluid pumps (105) are serially installed on the mentioned closed recycling heat transfer fluid path, the flowing direction thereof can be selected from one flowing direction or two flowing directions enabled to be switched or periodically changed;

The structure of the heat transfer fluid path formed between the mentioned electric energy application device assembly (108) and/or the heat dissipater thereof and the support tube (101) and the inner tube (103) includes one or more than one of followings:

(a) the interior of the electric energy application device assembly (108) is formed with one or more than one of penetrating heat transfer fluid paths connected in serial or in parallel, the fluid inlet port and the fluid outlet port are respectively communicated with the tube port of the support tube (101) and the tube port of the inner tube (103);

(b) the heat dissipater installed in the electric energy application device assembly (108) is formed with one or more than one of penetrating heat transfer fluid paths connected in parallel, the fluid inlet port and the fluid outlet port are respectively communicated with the tube port of the support tube (101) and the tube port of the inner tube (103);

(c) one or more than one of heat transfer fluid paths formed in the interior of the electric energy application device assembly (108) are connected in serial or in parallel with the heat transfer fluid paths formed in the heat dissipater thereof, the fluid inlet port and the fluid outlet port are respectively communicated with the tube port of the support tube (101) and the tube port of the inner tube (103);

(d) the electric energy application device assembly (108) is formed with two or more than two of heat transfer fluid paths connected through external tubes so as to form the fluid inlet port and the fluid outlet port respectively communicated with the tube port of the support tube (101) and the tube port of the inner tube (103), or the interior thereof is bent to the U-like shape or L-like shape, the fluid inlet port and the fluid outlet port at the same or different sides are respectively communicated with the tube port of the support tube (101) and the tube port of the inner tube (103);

(e) the exterior of the electric energy application device assembly (108) is installed with a sealed housing, thereby forming a space between the above two for allowing the heat transfer fluid to pass, the electric energy application device assembly (108) is formed with one or more than one of heat transfer fluid paths connected in serial or in parallel, one end thereof is formed with a heat transfer fluid inlet/outlet port which is leaded to the tube port of the inner tube (103), the tube port at the other end is leaded to the space formed between the housing and the electric energy application device assembly (108), a heat transfer fluid connection port is formed on the sealed housing for being communicated with the tube port of the support tube (101);

(f) a sealed space allowing the heat transfer fluid to pass is formed between the electric energy application device assembly (108) and the heat dissipater thereof and the installed housing, the electric energy application device assembly (108) and/or the heat dissipater thereof is formed with one or more than one of heat transfer fluid paths connected in serial or in parallel, one end thereof is formed with a heat transfer fluid inlet/outlet port which is leaded to the tube port of the inner tube (103), the tube port at the other end is leaded to the space formed between the housing and the electric energy application device assembly (108) and/or the heat dissipater thereof, a heat transfer fluid inlet/outlet port is formed on the sealed housing for being communicated with the tube port of the support tube (101);

(g) a sealed housing is jointly formed by the exterior of the electric energy application device assembly (108) and/or the heat dissipater thereof and the matched housing, the interior of the electric energy application device assembly (108) and/or the heat dissipater thereof and the matched housing is formed with a space allowing the heat transfer fluid to pass and leaded to the tube port of the support tube (101), the electric energy application device assembly (108) and/or the heat dissipater thereof is formed with one or more than one of heat transfer fluid paths connected in serial or in parallel, one end thereof is formed with a heat transfer fluid connection port which is leaded to the tube port of the inner tube (103), the tube port at the other end is leaded to the space formed between the housing and the electric energy application device assembly (108) and/or the heat dissipater thereof, a heat transfer fluid connection port is formed on the sealed housing for being communicated with the tube port of the support tube (101);

The gaseous or liquid heat transfer fluid pumped by the fluid pump (105) passes the support tube (101) of the closed recycling heat transfer fluid path and the exposed portion of the relevant structure, thereby enabling to perform temperature equalizing operation with the external gaseous or solid or liquid environment and/or the soil or liquid of the shallow ground natural thermal energy body.

The mentioned electric energy application device assembly (108) includes an illumination device utilizing electric energy being converted into photo energy, e.g. an illumination device adopting LED and/or a photovoltaic, e.g. a solar panel and/or a wind power generator and/or a transformer and/or a motor driven by electric energy, and peripheral devices, control circuits devices, overload protecting devices and/or temperature protection devices are optionally installed according to actual needs for assisting the operation of the electric energy application device assembly (108).

BRIEF DESCRIPTION OF THE DRAWINGS

FIG. 1 is a schematic view showing the main structure according to the present invention.

FIG. 2 is a cross section view of FIG. 1 taken along X-X.

FIG. 7 is a schematic structural view illustrating the photovoltaic (110) being adopted as the electric energy application device assembly (108) according to the present invention.

FIG. 8 is a cross sectional view of FIG. 7 taken along X-X.

FIG. 9 is a schematic structural view illustrating the wind power generating device (111) being adopted as the electric energy application device assembly (108) according to the present invention.

FIG. 13 is a first schematic view showing the tube structure according to the present invention.

FIG. 14 is a cross sectional view of FIG. 13 taken along X-X.

FIG. 15 is a second schematic view showing the tube structure according to the present invention.

FIG. 16 is a cross sectional view of FIG. 15 taken along X-X.

FIG. 17 is a third schematic view showing the tube structure according to the present invention.

FIG. 18 is a cross sectional view of FIG. 17 taken along X-X.

FIG. 19 is a fourth schematic view showing the tube structure according to the present invention.

FIG. 20 is a cross sectional view of FIG. 19 taken along X-X.

FIG. 28 is a second schematic structural view showing the support tube being formed as a U-shaped tube post (301), (302) according to one embodiment of the present invention.

FIG. 29 is a cross sectional view of the U-shaped tube post shown in FIG. 28.

FIG. 30 is a cross sectional view of FIG. 28 taken along X-X.

DESCRIPTION OF MAIN COMPONENT SYMBOLS

Figure 3:
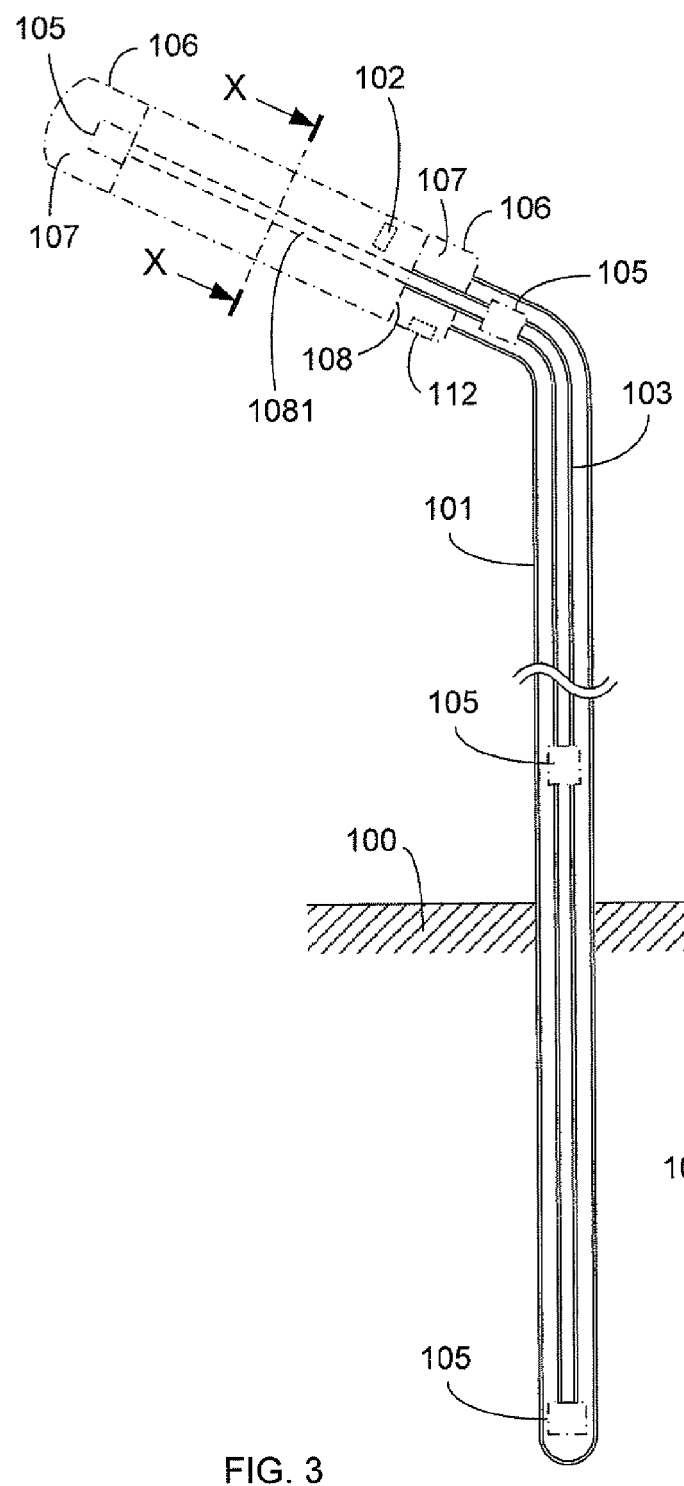
FIG. 3 is a schematic view showing the main structure shown in FIG. 1 installed with a housing according to the present invention.

100: Shallow ground natural thermal energy body
101: Support tube
102: Temperature protecting device
103: Inner tube
1031: Transversal hole
1032: Notch
1033: Supporter
104: Heat dissipater
1041: Heat transfer fluid path of heat dissipater
1042: U-shaped connection tube
105: Fluid pump
106: Housing
1061: Light-pervious member
107: Heat transfer fluid path
108: Electric energy application device assembly
1081: Heat transfer fluid path of electric energy application device assembly
109: Illumination device utilizing electric energy being converted into photo energy
110: Photovoltaic
111: Wind power generating device
222: Wind power generator
112: Electric controlling device
200: Bending portion of U-shaped tube
201-202: U-shaped tube post
301-302: U-shaped tube post
333: Motor
334: Motor driving load
444: Transformer
445: Transformer support rack
2001: Heat transfer fin
2002: Heat transfer covering member
2003: Spiral flow guiding structure

DETAILED DESCRIPTION OF THE PREFERRED EMBODIMENTS

A conventional electric energy application device assembly, e.g. an illumination device utilizing electric energy being converted into photo energy, an illumination device adopting LED, a photovoltaic, a wind power generator, a transformer or a motor, generates thermal energy while being operated, so over-heating prevention or anti-freezing for the mentioned assembly is very important;

The present invention provides a heat-dissipating structure having embedded support tube to form internally recycling heat transfer fluid and application apparatus, which is installed in the ground soil or liquid of a shallow ground natural thermal energy body for performing temperature equalizing operation with the external gaseous or solid or liquid environment and/or the soil or liquid of the shallow ground natural thermal energy body, the interior of a support tube (101) is installed with an inner tube (103) for being penetrated through, the inner diameter of the support tube (101) is greater than the outer diameter of the inner tube (103), the partitioned space formed through the diameter differentiation allows a fluid path to be formed, the distal end of the support tube (101) is sealed, the distal end of the inner tube (103) is shorter than the distal end of the support tube (101) or preformed with fluid holes, the distal ends of both tubes are formed with a flow returning segment allowing the heat transfer fluid to be returned;

The front tube port of the support tube (101) and the front tube port of the inner tube (103) allow the heat transfer fluid passing an electric energy application device assembly (108) and/or a heat dissipater thereof to be transferred, wherein one of the tube ports allows the heat transfer fluid to be transferred for passing the electric energy application device assembly (108) and/or the heat dissipater thereof, and the other tube port allows the heat transfer fluid which already passed the electric energy application device assembly (108) and/or the heat dissipater thereof to be returned;

One or more than one of fluid pumps (105) are serially installed on the mentioned closed recycling heat transfer fluid path, the flowing direction thereof can be selected from one flowing direction or two flowing directions enabled to be switched or periodically changed;

The structure of the heat transfer fluid path formed between the mentioned electric energy application device assembly (108) and/or the heat dissipater thereof and the support tube (101) and the inner tube (103) includes one or more than one of followings:

(a) the interior of the electric energy application device assembly (108) is formed with one or more than one of penetrating heat transfer fluid paths connected in serial or in parallel, the fluid inlet port and the fluid outlet port are respectively communicated with the tube port of the support tube (101) and the tube port of the inner tube (103);

(b) the heat dissipater installed in the electric energy application device assembly (108) is formed with one or more than one of penetrating heat transfer fluid paths connected in parallel, the fluid inlet port and the fluid outlet port are respectively communicated with the tube port of the support tube (101) and the tube port of the inner tube (103);

(c) one or more than one of heat transfer fluid paths formed in the interior of the electric energy application device assembly (108) are connected in serial or in parallel with the heat transfer fluid paths formed in the heat dissipater thereof, the fluid inlet port and the fluid outlet port are respectively communicated with the tube port of the support tube (101) and the tube port of the inner tube (103);

(d) the electric energy application device assembly (108) is formed with two or more than two of heat transfer fluid paths connected through external tubes so as to form the fluid inlet port and the fluid outlet port respectively communicated with the tube port of the support tube (101) and the tube port of the inner tube (103), or the interior thereof is bent to the U-like shape or L-like shape, the fluid inlet port and the fluid outlet port at the same or different sides are respectively communicated with the tube port of the support tube (101) and the tube port of the inner tube (103);

(e) the exterior of the electric energy application device assembly (108) is installed with a sealed housing, thereby forming a space between the above two for allowing the heat transfer fluid to pass, the electric energy application device assembly (108) is formed with one or more than one of heat transfer fluid paths connected in serial or in parallel, one end thereof is formed with a heat transfer fluid inlet/outlet port which is leaded to the tube port of the inner tube (103), the tube port at the other end is leaded to the space formed between the housing and the electric energy application device assembly (108), a heat transfer fluid connection port is formed on the sealed housing for being communicated with the tube port of the support tube (101);

(f) a sealed space allowing the heat transfer fluid to pass is formed between the electric energy application device assembly (108) and the heat dissipater thereof and the installed housing, the electric energy application device assembly (108) and/or the heat dissipater thereof is formed with one or more than one of heat transfer fluid paths connected in serial or in parallel, one end thereof is formed with a heat transfer fluid inlet/outlet port which is leaded to the tube port of the inner tube (103), the tube port at the other end is leaded to the space formed between the housing and the electric energy application device assembly (108) and/ or the heat dissipater thereof, a heat transfer fluid inlet/outlet port is formed on the sealed housing for being communicated with the tube port of the support tube (101);

(g) a sealed housing is jointly formed by the exterior of the electric energy application device assembly (108) and/or the heat dissipater thereof and the matched housing, the interior of the electric energy application device assembly (108) and/or the heat dissipater thereof and the matched housing is formed with a space allowing the heat transfer fluid to pass and leaded to the tube port of the support tube (101), the electric energy application device assembly (108) and/or the heat dissipater thereof is formed with one or more than one of heat transfer fluid paths connected in serial or in parallel, one end thereof is formed with a heat transfer fluid connection port which is leaded to the tube port of the inner tube (103), the tube port at the other end is leaded to the space formed between the housing and the electric energy application device assembly (108) and/ or the heat dissipater thereof, a heat transfer fluid connection port is formed on the sealed housing for being communicated with the tube port of the support tube (101);

The gaseous or liquid heat transfer fluid pumped by the fluid pump (105) passes the support tube (101) of the closed recycling heat transfer fluid path and the exposed portion of the relevant structure, thereby enabling to perform temperature equalizing operation with the external gaseous or solid or liquid environment and/or the soil or liquid of the shallow ground natural thermal energy body;

The mentioned electric energy application device assembly (108) includes an illumination device utilizing electric energy being converted into photo energy, e.g. an illumination device adopting LED and/or a photovoltaic, e.g. a solar panel and/or a wind power generator and/or a transformer and/or a motor driven by electric energy, and peripheral devices, control circuits devices, overload protecting devices and/or temperature protection devices are optionally installed according to actual needs for assisting the operation of the electric energy application device assembly (108);

Main components of the heat-dissipating structure having embedded support tube to form internally recycling heat transfer fluid and application apparatus are illustrated as followings:

FIG. 1 is a schematic view showing the main structure according to the present invention.

FIG. 2 is a cross section view of FIG. 1 taken along X-X.

As shown in FIG. 1 and FIG. 2, mainly consists:

support tube (101): related to a hollow tube member constituted by the material having mechanical strength, the tube body is divided into an upper tube body, a mid tube body and a lower tube body, wherein:

The upper tube body is mainly served to allow the electric energy application device assembly (108) to be installed;

The mid tube body is served to provide a support function and to transfer the thermal energy between the interior and the exterior of the tube;

The lower tube body is served to be installed in the stratum or liquid of the shallow ground natural thermal energy body for transferring thermal energy;

The support tube (101) includes being formed in a tube member with round shape or other geometric shapes, and being made of a material having mechanical strength and better heat conductivity or a material having heat insulation property; the mentioned support tube (101) can be optionally installed with heat transfer fins (2001) at the exterior of the tube member according to actual needs;

inner tube (103): constituted by a tube member having an outer diameter smaller than the inner diameter of the support tube (101) and made of a hard material, e.g. metal, or a flexible material or a soft material, e.g. plastic, or a fabric or other materials having similar properties, the inner tube (103) is formed in a linear or bended or curved shaped or can be freely deformed if being made of the flexible material or the soft material thereby being enabled to be installed in the support tube (101) without affecting the smoothness of the heat transfer fluid path, the upper end thereof is leaded to the heat transfer fluid path of the electric energy application device assembly (108) or the heat dissipater (104) thereof installed at the upper portion of the support tube (101), the lower end thereof is leaded to the mid portion or extended to the lower portion of the support tube (101), a diameter differentiation is formed between the outer diameter of the inner tube (103) and the inner diameter of the support tube (101) thereby forming a reversed space which can be served as the heat transfer fluid path, so the fluid path allowing the heat transfer fluid to pass is formed through the inner tube and two tube ports at two ends of the inner tube and the reserved space formed between the outer diameter of the inner tube and the inner diameter of the outer tube, and selected locations on the mentioned fluid path can be serially installed with one or more than one of fluid pumps (105), the space defined between the upper end of the inner tube (103) and the upper portion of the support tube (101) is served to allow the electric energy application device assembly (108) to be installed;

The inner tube (103) includes being formed in a tube member with round shape or other geometric shapes, and being made of (a) a hard material or flexible material or soft material having heat insulation property, or (b) a hard material or flexible material or soft material having better heat conductivity, and the exterior of the tube member is provided with a heat insulation material, or (c) a hard material or flexible material or soft material having better heat conductivity, and the interior of the tube member is provided with a heat insulation material, or (d) a hard material or flexible material or soft material having better heat conductivity;

fluid pump (105): constituted by a pump driven by an electric motor for being used to pump the gaseous or liquid heat transfer fluid with respect to the controlled flowing direction and flowing rate of the fluid to be pumped;

electric energy application device assembly (108): constituted by an illumination device driven by electric energy, and/or a power generator driven by the kinetic power provided by external gaseous or liquid fluid, and/or a device driven by photo energy for generating electric energy and also generating thermal loss, and/or a transformer and/or a motor driven by electric energy, and peripheral devices, control circuits devices, overload protecting devices and/or temperature protection devices are optionally installed according to actual needs for assisting the operation of the electric energy application device assembly (108).

According to the heat-dissipating structure having embedded support tube to form internally recycling heat transfer fluid and application apparatus, with the pumping operation provided by the fluid pump (105), the gaseous or liquid heat transfer fluid is allowed to pass the heat transfer fluid outlet port at the upper end of the inner tube (103), then pass the heat transfer fluid path of the electric energy application device assembly (108) which generates thermal loss during operation and the heat dissipater (104) thereof, then pass the heat transfer fluid path formed by the partitioned space defined between the interior of the support tube (101) and the inner tube (103) thereby being leaded to the lower tube body of the support tube (101) then returned from the heat transfer fluid inlet port at the lower end of the inner tube (103), thereby forming a closed recycling heat transfer fluid loop, or the heat transfer fluid pumped by the adapted fluid pump (105) can pass the mentioned paths in a reverse order and in the reverse flowing direction thereby forming a closed recycling heat transfer fluid loop having reverse order and reverse flowing direction, so through the heat transfer fluid passing the outer surface of the electric energy application device assembly (108) and the heat dissipater (104) thereof, and/or the exposed portion at the outer surface of the support tube (101), temperature equalizing operation is enabled to be performed with the external gaseous or liquid or solid environment, and/or the heat transfer fluid pumped by the fluid pump (105) is enabled to further transfer thermal energy to the stratum or liquid through the embedded portion of the support tube (101) installed in the stratum or liquid of the shallow ground natural thermal energy body.

According to the heat-dissipating structure having embedded support tube to form internally recycling heat transfer fluid and application apparatus, the upper tube body of the support tube (101) which allows the electric energy application device assembly (108) to be installed can be further installed with a housing (106) for protecting the electric energy application device assembly (108), and the space formed by the surface of the electric energy application device assembly (108) or the surface of the heat dissipater (104) thereof can be served as a heat transfer fluid path (107) for transferring the heat transfer fluid;

FIG. 3 is a schematic view showing the main structure shown in FIG. 1 installed with a housing according to the present invention.

Figure 4:
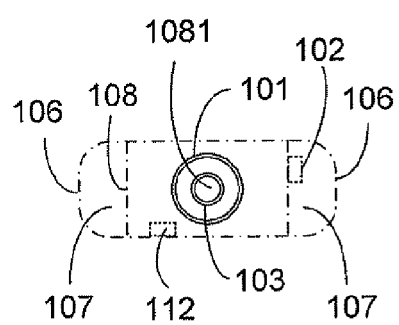
FIG. 4 is a cross section view of FIG. 3 taken along X-X.

FIG. 4 is a cross section view of FIG. 3 taken along X-X.

As shown in FIG. 3 and FIG. 4, mainly consists:

support tube (101): related to a hollow tube member constituted by the material having mechanical strength, the tube body is divided into an upper tube body, a mid tube body and a lower tube body, wherein:

The upper tube body is mainly served to allow the electric energy application device assembly (108) and the housing (106) to be installed;

The mid tube body is served to provide a support function and to transfer the thermal energy between the interior and the exterior of the tube;

The lower tube body is served to be installed in the stratum or liquid of the shallow ground natural thermal energy body for transferring thermal energy;

The support tube (101) includes being formed in a tube member with round shape or other geometric shapes, and being made of a material having mechanical strength and better heat conductivity or a material having heat insulation property; the mentioned support tube (101) can be optionally installed with heat transfer fins (2001) at the exterior of the tube member according to actual needs;

inner tube (103): constituted by a tube member having an outer diameter smaller than the inner diameter of the support tube (101) and made of a hard material, e.g. metal, or a flexible material or a soft material, e.g. plastic, or a fabric or other materials having similar properties, the inner tube (103) is formed in a linear or bended or curved shaped or can be freely deformed if being made of the flexible material or the soft material thereby being enabled to be installed in the support tube (101) without affecting the smoothness of the heat transfer fluid path, the upper end thereof is leaded to the heat transfer fluid path of the electric energy application device assembly (108) or the heat dissipater (104) thereof installed at the upper portion of the support tube (101), the lower end thereof is leaded to the mid portion or extended to the lower portion of the support tube (101), a diameter differentiation is formed between the outer diameter of the inner tube (103) and the inner diameter of the support tube (101) thereby forming a reversed space which can be served as the heat transfer fluid path, so the fluid path allowing the heat transfer fluid to pass is formed through the inner tube and two tube ports at two ends of the inner tube and the reserved space formed between the outer diameter of the inner tube and the inner diameter of the outer tube, and selected locations on the mentioned fluid path can be serially installed with one or more than one of fluid pumps (105), the space defined between the upper end of the inner tube (103) and the upper portion of the support tube (101) is served to allow the electric energy application device assembly (108) to be installed;

The inner tube (103) includes being formed in a tube member with round shape or other geometric shapes, and being made of (a) a hard material or flexible material or soft material having heat insulation property, or (b) a hard material or flexible material or soft material having better heat conductivity, and the exterior of the tube member is provided with a heat insulation material, or (c) a hard material or flexible material or soft material having better heat conductivity, and the interior of the tube member is provided with a heat insulation material, or (d) a hard material or flexible material or soft material having better heat conductivity;

fluid pump (105): constituted by a pump driven by an electric motor for being used to pump the gaseous or liquid heat transfer fluid with respect to the controlled flowing direction and flowing rate of the fluid to be pumped;

housing (106): made of a material having heat conductive or heat insulation property and used for covering the exterior of the electric energy application device assembly (108) so as to be sealed relative to the exterior, the heat transfer fluid is pumped by the fluid pump (105) for flowing from the heat transfer fluid outlet port at the upper end of the inner tube (103) to the space formed between the housing (106) and the electric energy application device assembly (108), then passing the heat transfer fluid path formed through the partitioned space defined by the inner diameter of the support tube (101) and the outer diameter of the inner tube (103), then flowing towards the lower tube body of the support tube (101), then returning via the heat transfer fluid inlet port at the lower end of the inner tube (103), thereby forming a closed recycling heat transfer fluid loop, or forming a closed recycling heat transfer fluid loop having opposite flowing direction through changing the fluid flowing direction in which the fluid pump (105) is pumping;

electric energy application device assembly (108): constituted by an illumination device driven by electric energy, and/or a power generator driven by the kinetic power provided by external gaseous or liquid fluid, and/or a device driven by photo energy for generating electric energy and also generating thermal loss, and/or a transformer and/or a motor driven by electric energy, and peripheral devices, control circuits devices, overload protecting devices and/or temperature protection devices are optionally installed according to actual needs for the operation of assisting the electric energy application device assembly (108).

electric controlling device (112): constituted by solid-state or electromechanical components, or chips and relevant operation software, the electric controlling device (112) is optionally installed;

temperature protecting device (102): constituted by electromechanical thermal actuated switch or thermal braking fuse, or solid-state temperature detecting units or solid-state temperature switch unit, served to directly or through the control of the electric controlling device (120) terminate the load or partially terminate the load or reduce the load power, when the load is overheated, and the temperature protecting device (102) is optionally installed.

Through the fluid pumps (105) serially installed on the heat transfer fluid path pumping the heat transfer fluid to flow from the heat transfer fluid outlet port at the upper end of the inner tube (103) and pass the space formed at the interior of the electric energy application device assembly (108) and/or the space defined between the exterior of the electric energy application device assembly (108) and the sealed housing, then pass the partitioned space of the fluid path defined between the inner diameter of the support tube (101) and the outer diameter of the inner tube (103), then return via the heat transfer fluid inlet port at the lower end of the inner tube (103) thereby forming the closed recycling flow, or forming a closed recycling heat transfer fluid loop having opposite flowing direction through changing the fluid flowing direction in which the fluid pump (105) is pumping, the thermal energy of the gaseous or liquid heat transfer fluid pumped by the fluid pump (105) is enabled to perform temperature equalizing operation with the external gaseous or liquid or solid environment through the outer surface of the electric energy application device assembly (108) and/or the surface of the sealed housing (106) installed at the exterior of the electric energy application device assembly (108) and/or the exposed portion at the outer surface of the support tube (101), and/or the heat transfer fluid pumped by the fluid pump (105) is enabled to further transfer thermal energy to the stratum or liquid through the embedded portion of the support tube (101) installed in the stratum or liquid of the shallow ground natural thermal energy body.

Figure 5:
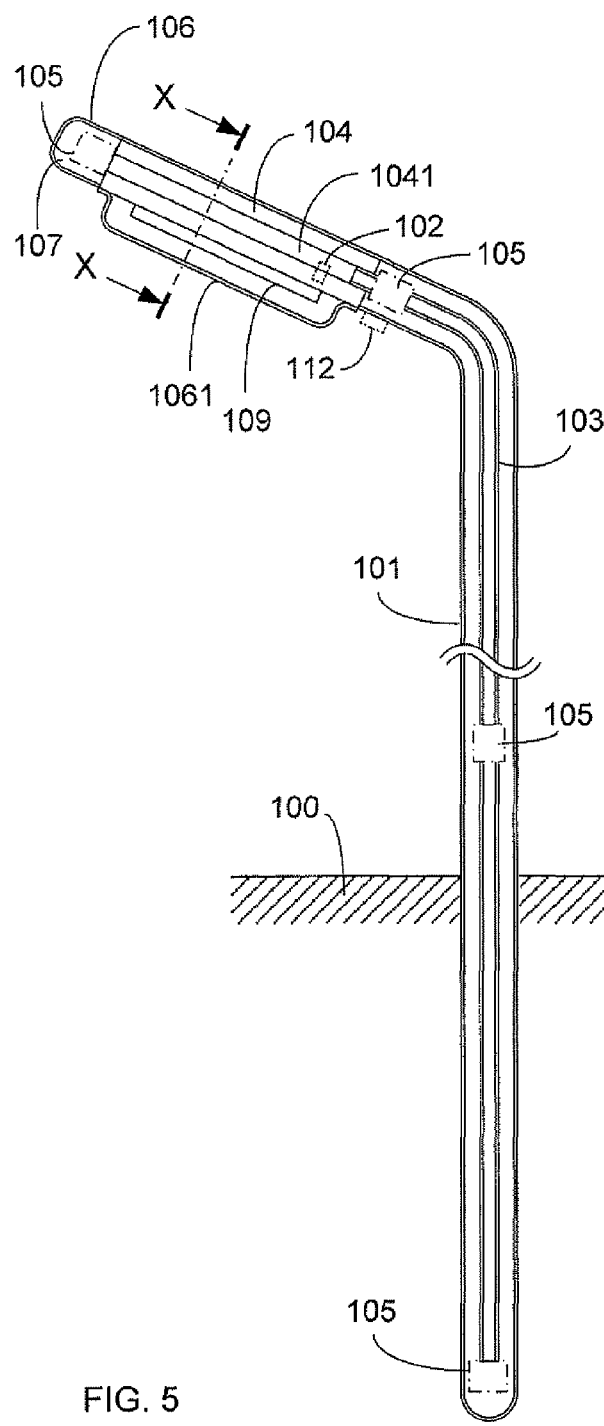
FIG. 5 is a schematic structural view illustrating the illumination device utilizing electric energy being converted into photo energy (109) being adopted as the electric energy application device assembly (108) according to the present invention.

According to the heat-dissipating structure having embedded support tube to form internally recycling heat transfer fluid and application apparatus, the electric energy application device assembly (108) includes an illumination device utilizing electric energy being converted into photo energy (109), e.g. an illumination device adopting LED, and/or a photovoltaic (110), e.g. a solar panel and/or a wind power generating device (111), and/or a transformer (444), and/or a motor (333) driven by electric energy, and peripheral devices, control circuits devices, overload protecting devices, temperature protecting devices are optionally installed according to actual needs for assisting the operation of the electric energy application device assembly (108), embodiments provided by the present invention are illustrated as followings:

FIG. 5 is a schematic structural view illustrating the illumination device utilizing electric energy being converted into photo energy (109) being adopted as the electric energy application device assembly (108) according to the present invention.

Figure 6:
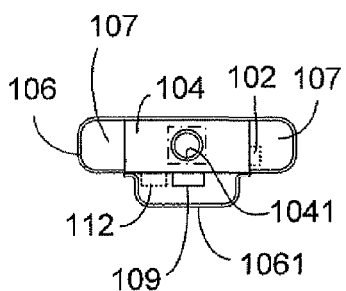
FIG. 6 is a cross sectional view of FIG. 5 taken along X-X.

FIG. 6 is a cross sectional view of FIG. 5 taken along X-X.

As shown in FIG. 5 and FIG. 6, the main configuration includes the support tube (101), the inner tube (103), the fluid pump (105), and the electric energy application device assembly (108) is designed to adopt the illumination device utilizing electric energy being converted into photo energy (109) which generates thermal loss and/or the light emitting diode (LED), and peripheral devices, control circuits devices, overload protecting devices, and temperature protection devices are optionally installed according to actual needs for assisting the operation of the illumination device utilizing electric energy being converted into photo energy (109);

Wherein: the heat transfer fluid pumped by the fluid pump (105) passes the heat transfer fluid path (107) formed on the surface or the interior of the illumination device utilizing electric energy being converted into photo energy (109) or the heat dissipater (104) thereof, the thermal energy transferred through the heat transfer fluid path (107) is enabled to perform temperature equalizing operation with the external gaseous or liquid or solid environment through the exposed portion at the outer surface of the support tube (101), and/or the heat transfer fluid pumped by the fluid pump (105) is enabled to further transfer thermal energy to the stratum or liquid through the embedded portion of the support tube (101) installed in the stratum or liquid of the shallow ground natural thermal energy body;

illumination device utilizing electric energy being converted into photo energy (109): constituted by an illumination device utilizing electric energy being converted into photo energy which is composed of various gaseous lamps, solid-state LED or OLED and other peripheral devices e.g. a light-pervious member (1061), and further including a display screen, a billboard, a signal or a warning sign operated through the photo energy of the illumination device utilizing electric energy being converted into photo energy (109);

fluid pump (105): constituted by a pump driven by an electric motor for being used to pump the gaseous or liquid heat transfer fluid with respect to the controlled flowing direction and flowing rate of the fluid to be pumped;

electric controlling device (112): constituted by solid-state or electromechanical components, or chips and relevant operation software; according to this embodiment, the electric controlling device (112) is served to control the input voltage, the current and the working temperature of the illumination device utilizing electric energy being converted into photo energy (109) and to control the operation timing of the fluid pump (105);

temperature protecting device (102): constituted by electromechanical thermal actuated switch or thermal braking fuse, or solid-state temperature detecting units or solid-state temperature switch unit, installed in the illumination device utilizing electric energy being converted into photo energy (109) or the heat dissipater (104) thereof, and served to directly or through the control of the electric controlling device (112) to terminate the load or partially terminate the load or reduce the load power or control the fluid pump (105), when the temperature is abnormal; the temperature protecting device (102) is optionally installed.

FIG. 7 is a schematic structural view illustrating the photovoltaic (110) being adopted as the electric energy application device assembly (108) according to the present invention.

FIG. 8 is a cross sectional view of FIG. 7 taken along X-X.

As shown in FIG. 7 and FIG. 8, the main configuration includes the support tube (101), the inner tube (103), the fluid pump (105), and the electric energy application device assembly (108) is designed to adopt the photovoltaic (110) capable of converting photo energy into electric energy and generating thermal loss, and peripheral devices, control circuits devices, overload protecting devices, and temperature protection devices are optionally installed according to actual needs for assisting the photovoltaic (110);

Wherein: the heat transfer fluid pumped by the fluid pump (105) passes the heat transfer fluid path (107) at the backside of the photovoltaic (110) or the surface or the interior of the heat dissipater (104) thereof, the thermal energy transferred through the heat transfer fluid path (107) is enabled to perform temperature equalizing operation with the external gaseous or liquid or solid environment through the exposed portion at the outer surface of the support tube (101), and/or the heat transfer fluid pumped by the fluid pump (105) is enabled to further transfer thermal energy to the stratum or liquid through the embedded portion of the support tube (101) installed in the stratum or liquid of the shallow ground natural thermal energy body;

photovoltaic (110): constituted by various types of photovoltaic which receives lights for generating and outputting electric energy, e.g. a solar panel, and other relevant peripheral devices;

fluid pump (105): constituted by a pump driven by an electric motor for being used to pump the gaseous or liquid heat transfer fluid with respect to the controlled flowing direction and flowing rate of the fluid to be pumped;

electric controlling device (112): constituted by solid-state or electromechanical components, or chips and relevant operation software; according to this embodiment, the electric controlling device (112) is served to control the output voltage, the current and the working temperature of the photovoltaic (110) and to control the operation timing of the fluid pump (105);

temperature protecting device (102): constituted by electromechanical thermal actuated switch or thermal braking fuse, or solid-state temperature detecting units or solid-state temperature switch unit, served to directly or through the control of the electric controlling device (112) terminate the load or partially terminate the load or reduce the load power or control the fluid pump (105), when the temperature of the photovoltaic (110) is abnormal; the temperature protecting device (102) is optionally installed.

FIG. 9 is a schematic structural view illustrating the wind power generating device (111) being adopted as the electric energy application device assembly (108) according to the present invention.

As shown in FIG. 9, the main configuration includes the support tube (101), the inner tube (103) and the fluid pump (105) installed in the shallow ground natural thermal energy body (100), and the electric energy application device assembly (108) is designed to adopt a wind power generator (222) of the wind power generating device (111), and peripheral devices, control circuits devices, overload protecting devices and/or temperature protection devices are optionally installed according to actual needs for assisting the operation of the wind power generating device (111);

Wherein: the heat transfer fluid pumped by the fluid pump (105) passes the heat transfer fluid path in the wind power generator (222) of the wind power generating device (111) and/or in the heat dissipater thereof, or further including the heat transfer fluid path in the electric controlling device (112) and/or in the heat dissipater thereof, and jointly with the inner tube (103) and the partitioned space formed between the inner tube (103) and the interior of the support tube (101) to form a sealed heat transfer fluid path, thereby allowing the heat transfer fluid to flow therein, and the temperature equalizing operation is enabled to be performed with the external gaseous or liquid or solid environment and/or the soil or liquid of the shallow ground natural thermal energy body through the exposed portion at the outer surface of the support tube (101);

wind power generating device (111): constituted by wind turbine blades and the wind power generator (222) driven thereby and/or the electric controlling device (112) and other relevant peripheral devices, wherein the wind power generator (222) and/or the electric controlling device (112) are the main components receiving the heat dissipating operation;

fluid pump (105): constituted by a pump driven by a wind power driven shaft or by an electric motor, used for pumping the gaseous or liquid heat transfer fluid with respect to the controlled flowing direction and flowing rate of the fluid to be pumped;

electric controlling device (112): constituted by solid-state or electromechanical components, or chips and relevant operation software, used for controlling the system operation of the wind power generating device (111), including the output voltage, the current and the working temperature of the wind power generator (222), AC and DC converting, parallel controlling of AC output electric energy and public electricity system, and controlling the operation timing of the fluid pump (105);

temperature protecting device (102): constituted by electromechanical thermal actuated switch or thermal braking fuse, or solid-state temperature detecting units or solid-state temperature switch unit, and served to directly or through the electric controlling device (112) control the system operation of the wind power generator (222) and/or the wind power generating device (111), as well as control the fluid pump (105) when the temperature of the wind power generating device (111) is abnormal; the temperature protecting device (102) is optionally installed.

Figure 10:
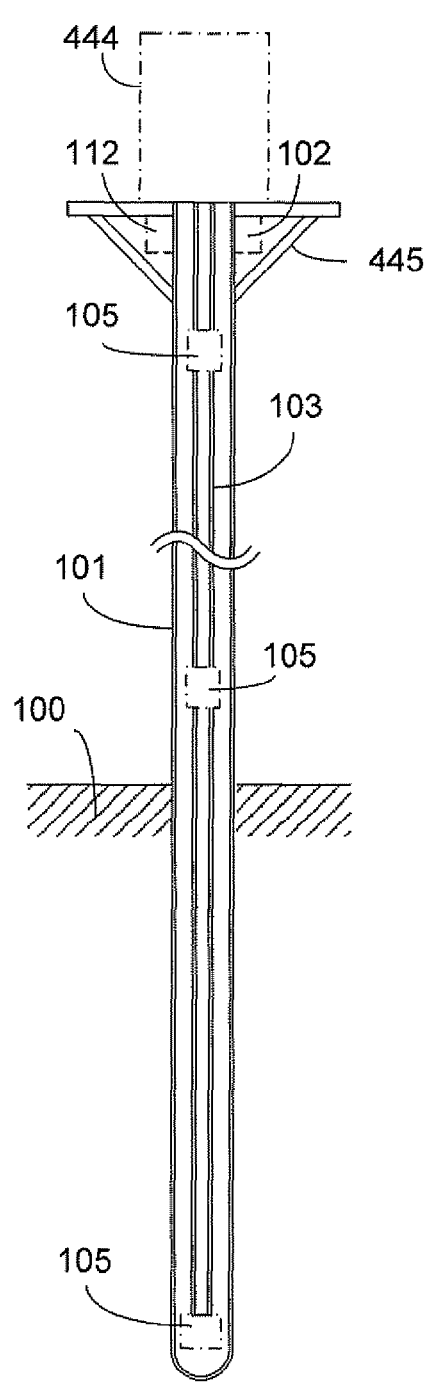
FIG. 10 is a schematic structural view illustrating the transformer (444) being adopted as the electric energy application device assembly (108) according to the present invention.

FIG. 10 is a schematic structural view illustrating the transformer (444) being adopted as the electric energy application device assembly (108) according to the present invention.

As shown in FIG. 10, the main configuration includes the support tube (101), the inner tube (103) and the fluid pump (105), and the electric energy application device assembly (108) is designed to adopt a transformer (444), and peripheral devices, control circuits devices, overload protecting devices and/or temperature protection devices are optionally installed according to actual needs for assisting the operation of the transformer (444);

Wherein: the heat transfer fluid pumped by the fluid pump (105) passes the heat transfer fluid path (107) formed on the surface or the interior of the transformer (444) or the heat dissipater (104) thereof, the thermal energy transferred through the heat transfer fluid path (107) is enabled to perform temperature equalizing operation with the external gaseous or liquid or solid environment through the exposed portion at the outer surface of the support tube (101), and/or the heat transfer fluid pumped by the fluid pump (105) is enabled to further transfer thermal energy to the stratum or liquid through the embedded portion of the support tube (101) installed in the stratum or liquid of the shallow ground natural thermal energy body;

transformer (444): including winding sets, magnetic conductive wirings and an enclosure, used for outputting and inputting single-phase or three-phase (including multiple-phase) AC electric energy, or inputting and outputting pulse electric energy; the transformer includes the self-coupled or separated-winding transformer having a dry structure containing gas or wet structure containing cooling fluid, the surface or the exterior of the transformer is formed with a pipeline heat dissipating structure allowing the fluid to pass, or formed with a fluid inlet/outlet port allowing the fluid to flow in or out of the internal space of the transformer; the transformer is combined on the support tube (101) through a transformer support rack (445);

fluid pump (105): constituted by a pump driven by electric energy, used for pumping the gaseous or liquid heat transfer fluid with respect to the controlled flowing direction and flowing rate of the fluid to be pumped;

electric controlling device (112): constituted by solid-state or electromechanical components, or chips and relevant operation software; according to this embodiment, the electric controlling device (112) is used for controlling the output voltage, the current and the working temperature of the transformer (444), and controlling the operation timing of the fluid pump (105);

temperature protecting device (102): constituted by electromechanical thermal actuated switch or thermal braking fuse, or solid-state temperature detecting units or solid-state temperature switch unit, served to directly or through the control of the electric controlling device (112) terminate the load or partially terminate the load or reduce the load power and control the fluid pump (105), when the temperature of the transformer (444) is abnormal; the temperature protecting device (102) is optionally installed.

Figure 11:
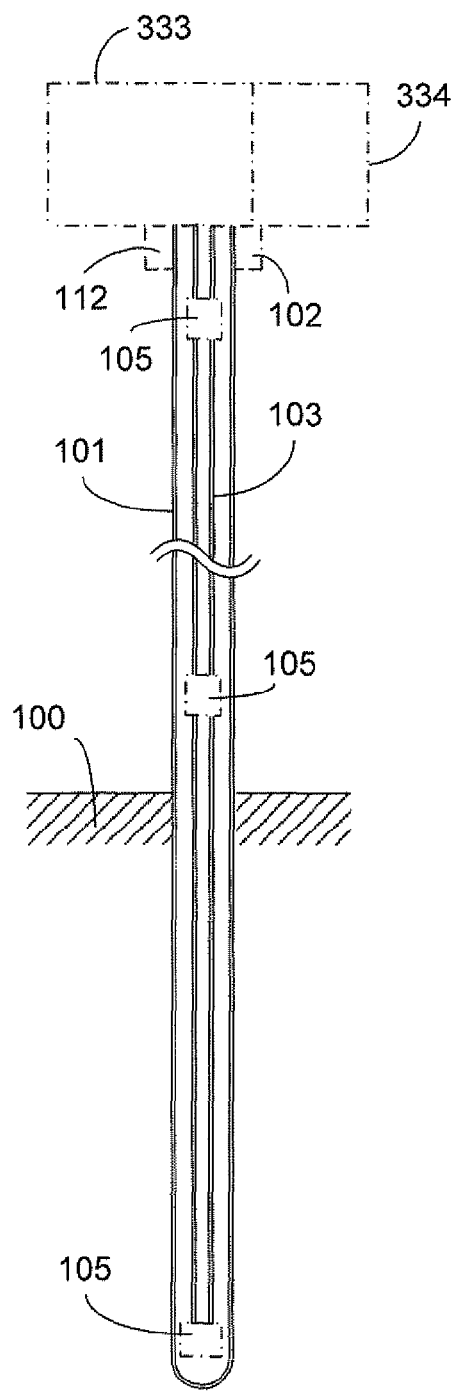
FIG. 11 is a schematic structural view illustrating the motor (333) driven by electric energy being adopted as the electric energy application device assembly (108) according to the present invention.

FIG. 11 is a schematic structural view illustrating the motor (333) driven by electric energy being adopted as the electric energy application device assembly (108) according to the present invention.

As shown in FIG. 11, the main configuration includes the support tube (101), the inner tube (103) and the fluid pump (105), and the electric energy application device assembly (108) is designed to adopt a motor (333) driven by electric energy, and peripheral devices, control circuits devices, overload protecting devices and/or temperature protection devices are optionally installed according to actual needs for assisting the operation of the motor (333);

Wherein: the heat transfer fluid pumped by the fluid pump (105) passes the heat transfer fluid path (107) formed on the surface or the interior of the motor (333) driven by electric energy or the heat dissipater (104) thereof, the thermal energy transferred through the heat transfer fluid path (107) is enabled to perform temperature equalizing operation with the external gaseous or liquid or solid environment through the exposed portion at the outer surface of the support tube (101), and/or the heat transfer fluid pumped by the fluid pump (105) is enabled to further transfer thermal energy to the stratum or liquid through the embedded portion of the support tube (101) installed in the stratum or liquid of the shallow ground natural thermal energy body;

motor (333): constituted by a revolving electromechanical device driven by AC or DC electric energy for outputting rotational kinetic energy thereby driving the motor driven load (334).

fluid pump (105): constituted by a pump driven by electric energy, used for pumping the gaseous or liquid heat transfer fluid with respect to the controlled flowing direction and flowing rate of the fluid to be pumped;

electric controlling device (112): constituted by solid-state or electromechanical components, or chips and relevant operation software; according to this embodiment, the electric controlling device (112) is used for controlling the input voltage, the current and the working temperature of the motor (333) driven by electric energy, and controlling the operation timing of the fluid pump (105);

temperature protecting device (102): constituted by electromechanical thermal actuated switch or thermal braking fuse, or solid-state temperature detecting units or solid-state temperature switch unit, served to directly or through the control of the electric controlling device (112) terminate the load or partially terminate the load or reduce the load power and control the fluid pump (105), when the temperature of the motor (333) driven by electric energy is abnormal; the temperature protecting device (102) is optionally installed.

Figure 12:
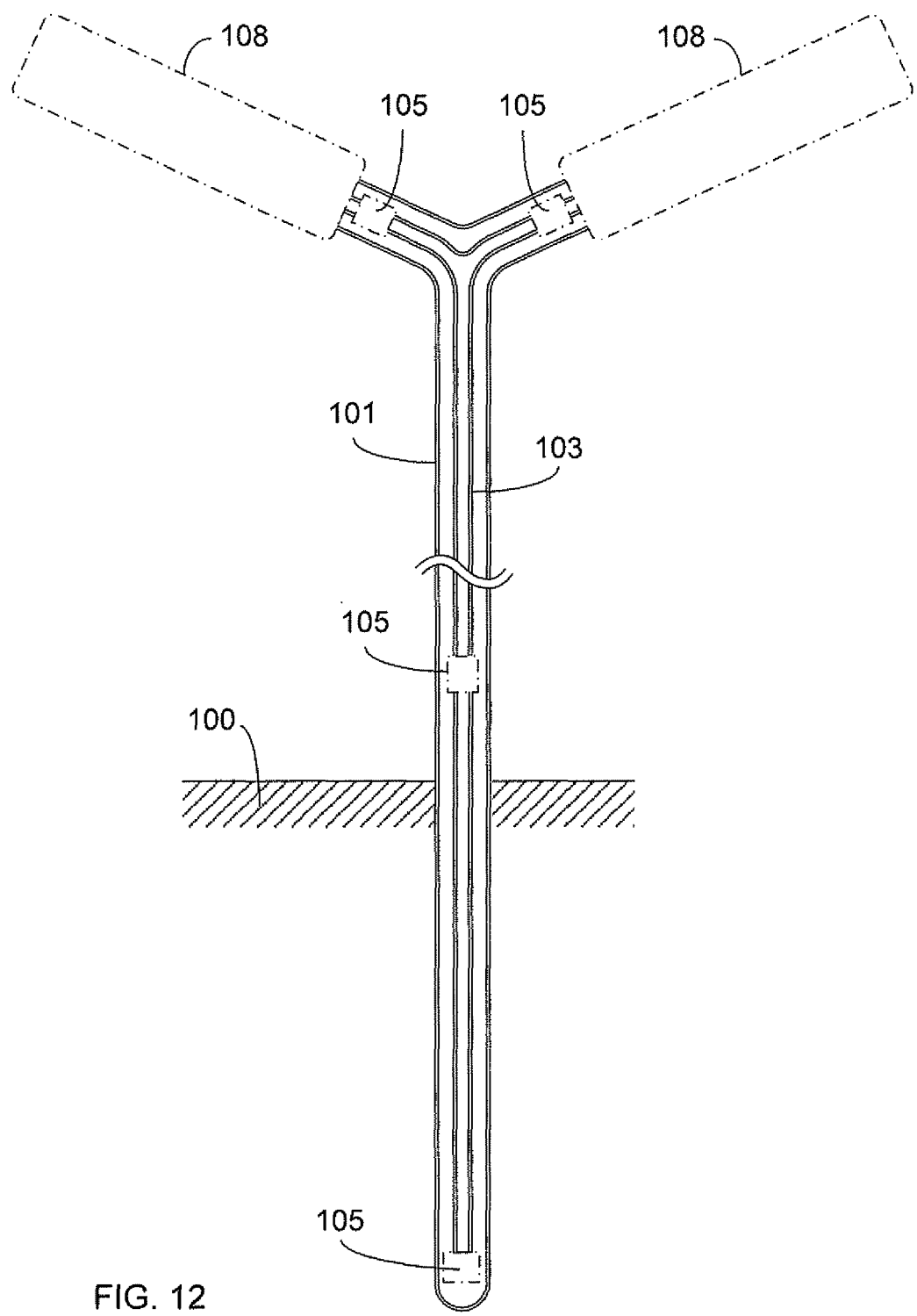
FIG. 12 is a schematic structural view showing the upper portion of the support tube (101) being formed by a manifold structure for being installed with plural electric energy application device assemblies (108) which sharing the mid tube body and the lower tube body of the support tube (101), according to the present invention.

According to the heat-dissipating structure having embedded support tube to form internally recycling heat transfer fluid and application apparatus, the upper portion of the support tube (101) and the inner tube (103) can be further formed by a manifold structure for being installed with plural the same or different electric energy application device assemblies (108) which share the mid tube body and the lower tube body of the support tube;

FIG. 12 is a schematic structural view showing the upper portion of the support tube (101) being formed by a manifold structure for being installed with plural electric energy application device assemblies (108) which sharing the mid tube body and the lower tube body of the support tube (101), according to the present invention.

As shown in FIG. 12, the main configuration includes the mentioned support tube (101), the inner tube (103), the fluid pump (105), wherein the upper portion of the support tube (101) is formed with a manifold structure allowing plural electric energy application device assemblies (108) to be installed thereon, and peripheral devices, control circuits devices, overload protecting devices and/or temperature protection devices are optionally installed according to actual needs for assisting the electric energy application device assembly (108), the plural electric energy application device assemblies (108) share the mid tube body and the lower tube body of the support tube (101), and same or different electric energy application device assemblies (108) are respectively installed on the manifold formed on the upper portion of the support tube (101), and correspondingly installed with an inner tube (103) in the support tube (101);

Wherein: the heat transfer fluid pumped by the fluid pump (105) passes the heat transfer fluid path (107) formed on the surface or the interior of the individual electric energy application device assembly (108) or the heat dissipater (104) thereof, the thermal energy transferred through the heat transfer fluid path (107) is enabled to perform temperature equalizing operation with the external gaseous or liquid or solid environment, and/or the heat transfer fluid pumped by the fluid pump (105) is enabled to further transfer thermal energy to the stratum or liquid through the embedded portion of the support tube (101) installed in the stratum or liquid of the shallow ground natural thermal energy body.

According to the heat-dissipating structure having embedded support tube to form internally recycling heat transfer fluid and application apparatus, there are many ways to form the heat transfer fluid path through the lower portion of the support tube (101) and the inner tube (103), followings are examples for illustration and shall not be seen as a limitation to the present invention, structures having the same functional operations are all within the scope of the present invention: wherein the structure formed by the support tube (101) and the inner tube (103) includes one or more than one of followings:

FIG. 13 is a first schematic view showing the tube structure according to the present invention.

FIG. 14 is a cross sectional view of FIG. 13 taken along X-X.

As shown in FIG. 13 and FIG. 14, the main configuration is that the support tube (101) and the inner tube (103) are coaxially arranged or arranged in a substantially parallel manner, the space defined by the periphery of the inner tube (103) and between the support tube (101) and the inner tube (103) is served to allow the heat transfer fluid to pass, the inner tube (103) installed in the support tube (101) is shorter than the support tube (101), a length differentiation is formed between the lower end thereof and the sealed part at the lower portion of the support tube (101) and a supporter (1033) is provided for fastening, thereby forming the space allowing the heat transfer fluid to pass.

FIG. 15 is a second schematic view showing the tube structure according to the present invention.

FIG. 16 is a cross sectional view of FIG. 15 taken along X-X.

As shown in FIG. 15 and FIG. 16, the main configuration is that the support tube (101) and the inner tube (103) are installed in parallel, the lower end of the inner tube (103) in the support tube (101) is combined with the sealed part at the bottom of the lower portion of the support tube (101), the lower end or the lower portion of the inner tube (103) is formed with a transversal hole (1031) or a notch (1032) penetrating the inner tube thereby allowing the heat transfer fluid to pass.

FIG. 17 is a third schematic view showing the tube structure according to the present invention.

FIG. 18 is a cross sectional view of FIG. 17 taken along X-X.

As shown in FIG. 17 and FIG. 18, the main configuration is that the support tube (101) and the inner tube (103) are eccentrically combined arranged, the lower end of the inner tube (103) in the support tube (101) is shorter, a length differentiation is formed between the lower end thereof and the sealed part at the bottom of the lower portion of the support tube (101) thereby forming a space allowing the heat transfer fluid to pass.

FIG. 19 is a fourth schematic view showing the tube structure according to the present invention.

FIG. 20 is a cross sectional view of FIG. 19 taken along X-X.

As shown in FIG. 19 and FIG. 20, the main configuration is that the support tube (101) and two or more than two of the inner tubes (103) are installed in parallel, the lower ends of the inner tubes (103) in the support tube (101) are shorter, a length differentiation is formed between the lower end thereof and the sealed part at the bottom of the lower portion of the support tube (101) thereby forming a space allowing the heat transfer fluid to pass.

Figure 21:
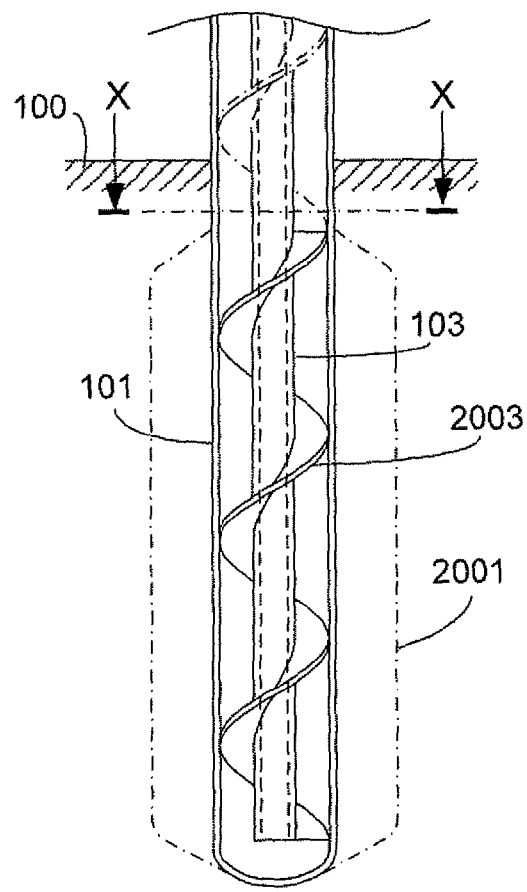
FIG. 21 is a fifth schematic view showing the tube structure according to the present invention.

FIG. 21 is a fifth schematic view showing the tube structure according to the present invention.

Figure 22:
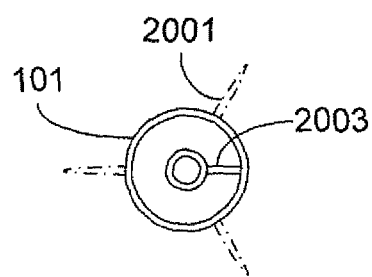
FIG. 22 is a cross sectional view of FIG. 21 taken along X-X.

FIG. 22 is a cross sectional view of FIG. 21 taken along X-X.

As shown in FIG. 21 and FIG. 22, the main configuration is that the support tube (101) and the inner tube (103) are coaxially arranged or arranged in a substantially parallel manner, the space defined by the periphery of the inner tube (103) and between the support tube (101) and the inner tube (103) is served to allow the heat transfer fluid to pass, the inner tube (103) installed in the support tube (101) is shorter than the support tube (101), a length differentiation is formed between the lower end thereof and the sealed part at the bottom of the lower portion of the support tube (101) thereby forming a space allowing the heat transfer fluid to pass, a spiral flow guiding structure (2003) is further installed between the support tube (101) and the inner tube (103) thereby increasing the length of the heat transfer fluid path formed between the support tube (101) and the inner tube (103).

Figure 23:
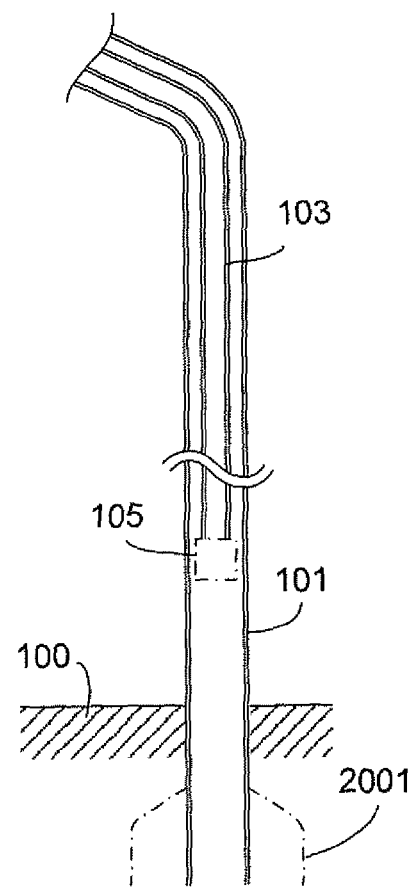
FIG. 23 is a schematic structural view showing the lower end of the inner tube (103) shown in FIG. 13 and FIG. 14 being shortened and not extended to the lower portion of the support tube (101) according to one embodiment of the present invention.

According to the heat-dissipating structure having embedded support tube to form internally recycling heat transfer fluid and application apparatus, the inner tube (103) in the support tube (101) can also be shortened and only the upper end being extended to the upper portion or the mid portion of the support tube (101) and not extended to the lower portion, including:

FIG. 23 is a schematic structural view showing the lower end of the inner tube (103) shown in FIG. 13 and FIG. 14 being shortened and not extended to the lower portion of the support tube (101) according to one embodiment of the present invention.

As shown in FIG. 23, the main configuration is that the support tube (101) and the inner tube (103) are coaxially arranged or arranged in a substantially parallel manner, the space defined by the periphery of the inner tube (103) and between the support tube (101) and the inner tube (103) is served to allow the heat transfer fluid to pass, the inner tube (103) installed in the support tube (101) is shorter than the support tube (101), and only extended to the upper portion or the mid portion of the support tube (101) and not extended to the lower portion, thereby shortening the length of the heat transfer fluid path.

Figure 24:
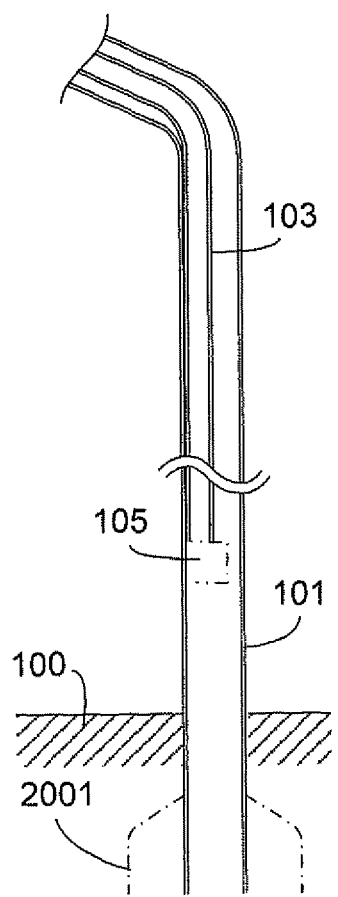
FIG. 24 is a schematic structural view showing the lower end of the inner tube (103) shown in FIG. 17 and FIG. 18 being shortened and not extended to the lower portion of the support tube (101) according to one embodiment of the present invention.

FIG. 24 is a schematic structural view showing the lower end of the inner tube (103) shown in FIG. 17 and FIG. 18 being shortened and not extended to the lower portion of the support tube (101) according to one embodiment of the present invention.

As shown in FIG. 24, the main configuration is that the support tube (101) and the inner tube (103) are eccentrically combined arranged, the lower end of the inner tube (103) installed in the support tube (101) is shorter than the support tube (101), and only extended to the upper portion or the mid portion of the support tube (101) and not extended to the lower portion, thereby shortening the length of the heat transfer fluid path.

Figure 25:
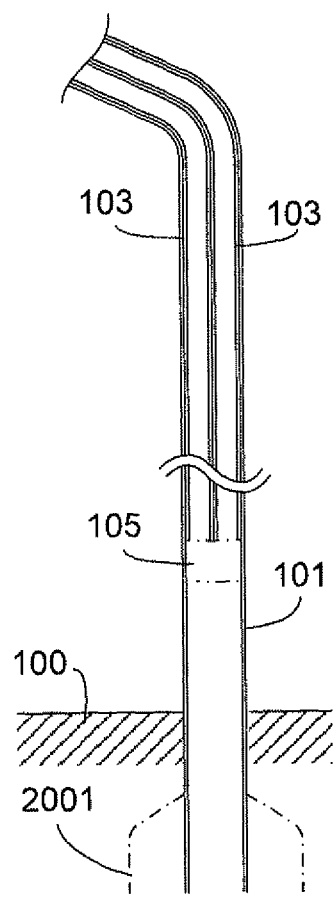
FIG. 25 is a schematic structural view showing the lower end of the inner tube (103) shown in FIG. 19 and FIG. 20 being shortened and not extended to the lower portion of the support tube (101) according to one embodiment of the present invention.

FIG. 25 is a schematic structural view showing the lower end of the inner tube (103) shown in FIG. 19 and FIG. 20 being shortened and not extended to the lower portion of the support tube (101) according to one embodiment of the present invention.

As shown in FIG. 25, the main configuration is that the support tube (101) and two or more than two of the inner tubes (103) are arranged in parallel, the lower end of the inner tubes (103) installed in the support tube (101) are shorter than the support tube (101), and only extended to the upper portion or the mid portion of the support tube (101) and not extended to the lower portion, thereby shortening the length of the heat transfer fluid path.

Figures 26, 27:
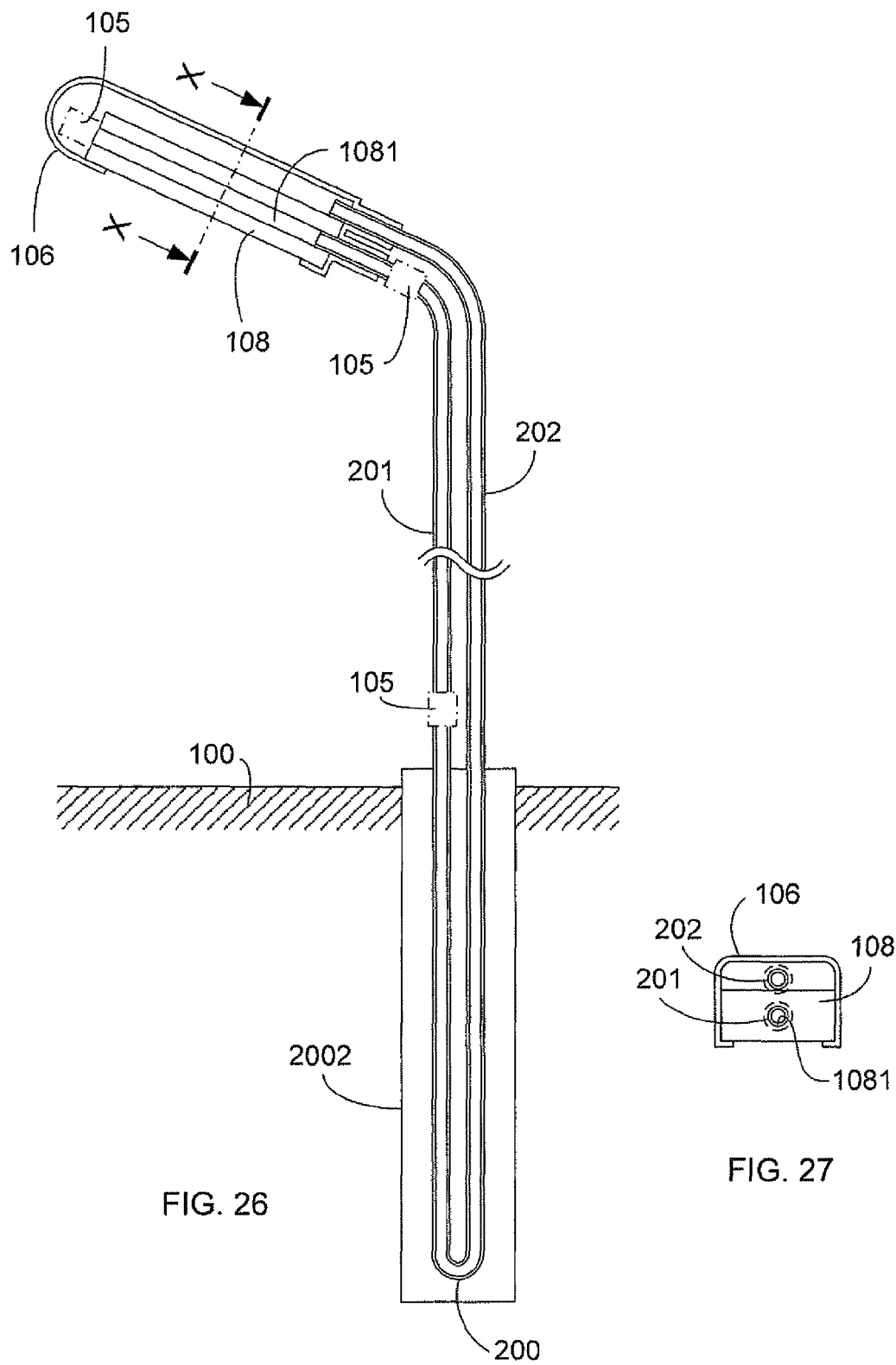
FIG. 26 is a first schematic structural view showing the support tube being formed as a U-shaped tube post (301), (302) according to one embodiment of the present invention.
FIG. 27 is a cross sectional view of FIG. 26 taken along X-X.

According to the heat-dissipating structure having embedded support tube to form internally recycling heat transfer fluid and application apparatus, the support tube for transferring the internally recycling heat transfer fluid can be further formed as a U-shaped tube member, illustrated as followings:

FIG. 26 is a first schematic structural view showing the support tube being formed as a U-shaped tube post (301), (302) according to one embodiment of the present invention.

FIG. 27 is a cross sectional view of FIG. 26 taken along X-X.

As shown in FIG. 26 and FIG. 27, the main configuration is that the U-shaped tube posts (201), (202) are leaded to the electric energy application device assembly (108) with a manner of one tube post higher than the other, the U-shaped tube posts (201), (202) are respectively leaded to the inlet and the outlet of the heat transfer fluid path of the electric energy application device assembly (108) and/or the heat dissipater (104) thereof, or leaded to the inlet and the outlet of the heat transfer fluid path formed in the internal space jointly defined by the outer surface of the electric energy application device assembly (108) and/or the heat dissipater (104) thereof and the housing (106), wherein the U-shaped tube post (201) is leaded to the mentioned inlet port, the U-shaped tube post (202) is leaded to the mentioned outlet port, and the lower portion of the U-shaped tube is formed with a bending portion (200) of U-shaped tube thereby forming a heat transfer fluid loop, and one or more than one of the fluid pumps (105) serially installed on the mentioned heat transfer fluid path are operated to pump in a selected direction, the bending portion (200) of U-shaped tube and the adjacent lower portion are directly embedded in the shallow ground natural thermal energy body (100); or the bending portion (200) of U-shaped tube and the adjacent lower portion can be further embedded in a columnar heat transfer covering member (2002) installed in the shallow ground natural thermal energy body (100);

In the mentioned U-shaped tube posts (201), (202), the U-shaped tube post (202) includes being formed in a tube member with round shape or other geometric shapes, and being made of a material having mechanical strength and better heat conductivity or a material having heat insulation property; the U-shaped tube post (201) includes being formed in a tube member with round shape or other geometric shapes, and being made of (a) a hard material or flexible material or soft material having heat insulation property, or (b) a hard material or flexible material or soft material having better heat conductivity, and the exterior of the tube member is provided with a heat insulation material, or (c) a hard material or flexible material or soft material having better heat conductivity, and the interior of the tube member is provided with a heat insulation material, or (d) a hard material or flexible material or soft material having better heat conductivity;

The mentioned U-shaped tube posts (201), (202) can be installed with heat transfer fins (2001) between or at the exterior of the tube bodies according to actual needs.

FIG. 28 is a second schematic structural view showing the support tube being formed as a U-shaped tube post (301), (302) according to one embodiment of the present invention.

FIG. 29 is a cross sectional view of the U-shaped tube post shown in FIG. 28.

FIG. 30 is a cross sectional view of FIG. 28 taken along X-X.

As shown in FIG. 28, FIG. 29 and FIG. 30, the main configuration is that the U-shaped tube posts (301), (302) are leaded to the electric energy application device assembly (108) at the left and the right side, the U-shaped tube posts (301), (302) are respectively leaded to the inlet and outlet of the heat transfer fluid path of the electric energy application device assembly (108) and/or the heat dissipater (104) thereof, or leaded to the inlet and outlet of the heat transfer fluid path formed in the internal space jointly defined by the outer surface of the electric energy application device assembly (108) and/or the heat dissipater (104) thereof and the housing (106), wherein the U-shaped tube post (301) is leaded to the mentioned inlet, the U-shaped tube post (302) is leaded to the mentioned outlet, and the lower portion of the U-shaped tube is formed with a bending portion (200) of U-shaped tube thereby forming a heat transfer fluid loop, and one or more than one of the fluid pumps (105) serially installed on the mentioned heat transfer fluid path are operated to pump in a selected direction, the bending portion (200) of U-shaped tube and the adjacent lower portion are directly embedded in the shallow ground natural thermal energy body (100); or the bending portion (200) of U-shaped tube and the adjacent lower portion can be further embedded in a columnar heat transfer covering member (2002) installed in the shallow ground natural thermal energy body (100);

In the mentioned U-shaped tube posts (301), (302), the U-shaped tube post (302) includes being formed in a tube member with round shape or other geometric shapes, and being made of a material having mechanical strength and better heat conductivity or a material having heat insulation property; the U-shaped tube post (301) includes being formed in a tube member with round shape or other geometric shapes, and being made of (a) a hard material or flexible material or soft material having heat insulation property, or (b) a hard material or flexible material or soft material having better heat conductivity, and the exterior of the tube member is provided with a heat insulation material, or (c) a hard material or flexible material or soft material having better heat conductivity, and the interior of the tube member is provided with a heat insulation material, or (d) a hard material or flexible material or soft material having better heat conductivity;

The mentioned U-shaped tube posts (301), (302) can be installed with heat transfer fins (2001) between or at the exterior of the tube bodies according to actual needs.

Figures 31, 32:
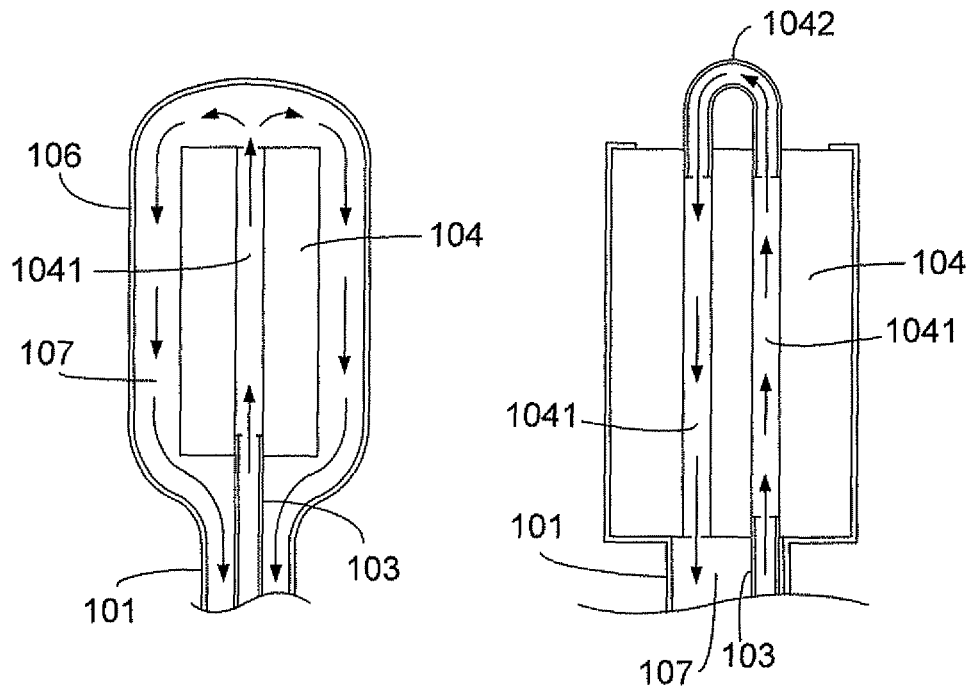
FIG. 31 is a schematic structural view showing a heat transfer fluid path allowing the gaseous or liquid heat transfer fluid to pass being formed by the space defined between the heat dissipater (104) of the electric energy application device assembly (108) and the housing (106) and the heat transfer fluid path of heat dissipater (1041) of the heat dissipater (104) according to the present invention.
FIG. 32 is a schematic structural view showing a heat transfer fluid path allowing the gaseous or liquid heat transfer fluid to pass being formed by at least two heat transfer fluid paths (1041) of the heat dissipater (104) of the electric energy application device assembly (108) being connected with a U-shaped connection tube (1042) according to the present invention.

FIG. 31 is a schematic structural view showing a heat transfer fluid path allowing the gaseous or liquid heat transfer fluid to pass being formed by the space defined between the heat dissipater (104) of the electric energy application device assembly (108) and the housing (106) and the heat transfer fluid path (1041) of heat dissipater of the heat dissipater (104) according to the present invention.

As shown in FIG. 31, the main configuration is that a heat transfer fluid path allowing the gaseous or liquid heat transfer fluid to pass is formed by the space defined between the heat dissipater (104) of the electric energy application device assembly (108) and the housing (106) and the heat transfer fluid path (1041) of heat dissipater of the heat dissipater (104).

FIG. 32 is a schematic structural view showing a heat transfer fluid path allowing the gaseous or liquid heat transfer fluid to pass being formed by at least two heat transfer fluid paths (1041) of the heat dissipater (104) of the electric energy application device assembly (108) being connected with a U-shaped connection tube (1042) according to the present invention.

As shown in FIG. 32, a heat transfer fluid path allowing the gaseous or liquid heat transfer fluid to pass is formed by at least two heat transfer fluid paths (1041) of the heat dissipater (104) of the electric energy application device assembly (108) being connected with a U-shaped connection tube (1042).

Figures 33, 34:
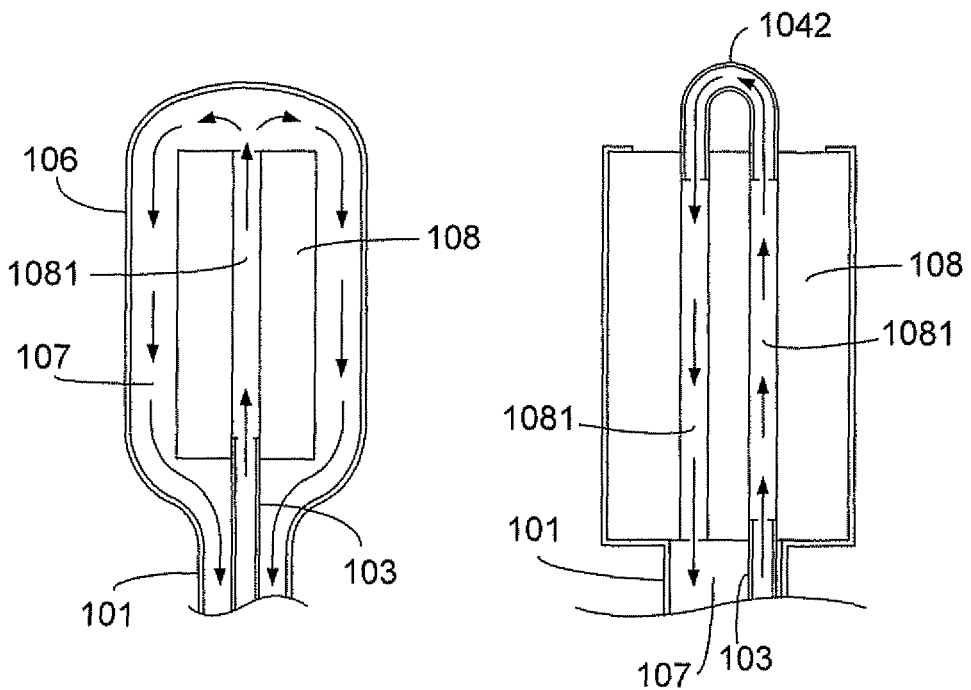
FIG. 33 is a schematic structural view showing a heat transfer fluid path allowing the gaseous or liquid heat transfer fluid to pass being formed by the space defined between the electric energy application device assembly (108) and the housing (106) and the heat transfer fluid path (1081) of the electric energy application device assembly (108) according to the present invention.
FIG. 34 is a schematic structural view showing a heat transfer fluid path allowing the gaseous or liquid heat transfer fluid to pass being formed by at least two heat transfer fluid paths (1081) of the electric energy application device assembly (108) being connected in serial with a U-shaped connection tube (1042) according to the present invention.

FIG. 33 is a schematic structural view showing a heat transfer fluid path allowing the gaseous or liquid heat transfer fluid to pass being formed by the space defined between the electric energy application device assembly (108) and the housing (106) and the heat transfer fluid path (1081) of the electric energy application device assembly (108) according to the present invention.

As shown in FIG. 33, the main configuration is that a heat transfer fluid path allowing the gaseous or liquid heat transfer fluid to pass is formed by the space defined between the electric energy application device assembly (108) and the housing (106) and the heat transfer fluid path (1081) of the electric energy application device assembly (108).

FIG. 34 is a schematic structural view showing a heat transfer fluid path allowing the gaseous or liquid heat transfer fluid to pass being formed by at least two heat transfer fluid paths (1081) of the electric energy application device assembly (108) being connected in serial with a U-shaped connection tube (1042) according to the present invention.

As shown in FIG. 34, a heat transfer fluid path allowing the gaseous or liquid heat transfer fluid to pass is formed by at least two heat transfer fluid paths (1081) of the electric energy application device assembly (108) being connected in serial with a U-shaped connection tube (1042).

Figure 35:
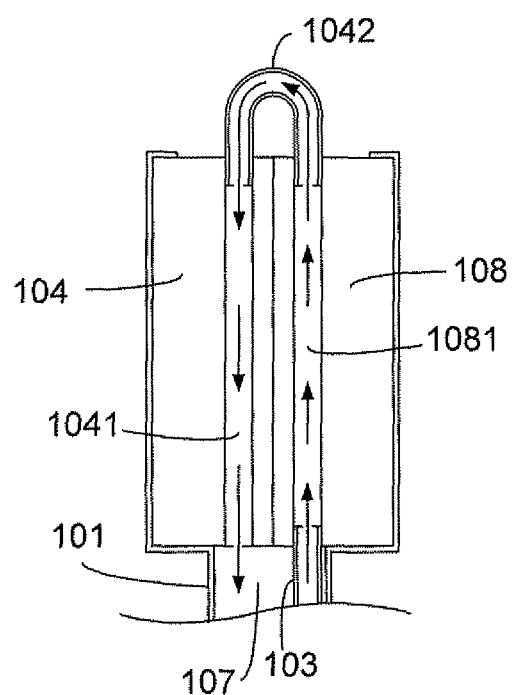
FIG. 35 is a schematic structural view showing a heat transfer fluid path allowing the gaseous or liquid heat transfer fluid to pass being formed by a U-shaped connection tube (1042) being connected in serial between at least one heat transfer fluid path (1081) of the electric energy application device assembly (108) and at least one heat transfer fluid path (1041) of the heat dissipater (104) thereof according to the present invention.

FIG. 35 is a schematic structural view showing a heat transfer fluid path allowing the gaseous or liquid heat transfer fluid to pass being formed by a U-shaped connection tube (1042) being connected in serial between at least one heat transfer fluid path (1081) of the electric energy application device assembly (108) and at least one heat transfer fluid path (1041) of the heat dissipater (104) thereof according to the present invention.

As shown FIG. 35, a heat transfer fluid path allowing the gaseous or liquid heat transfer fluid to pass is formed by a U-shaped connection tube (1042) being connected in serial between at least one heat transfer fluid path (1081) of the electric energy application device assembly (108) and at least one heat transfer fluid path (1041) of the heat dissipater (104) thereof.

The invention claimed is:

1. A heat-dissipating structure with internally recycling heat transfer fluid, comprising:

an embedded support tube (101) and at least one inner tube (103) installed within the support tube (101), the support tube (101) having an inner diameter that is larger than an outer diameter of the at least one inner tube (103), a space between the inner diameter of the support tube (101) and the outer diameter of the at least one inner tube (103) forming an exterior fluid path, wherein the support tube (101) is made of a thermally conductive or thermally insulating material and has a circular or non-circular cross-section, wherein a distal end of the at least one inner tube (103) is arranged to enable the heat transfer fluid to flow between the exterior fluid path and an interior fluid path within the at least one inner tube (103) and thereby provide a fluid circulation path for circulation of the recycling heat transfer fluid, and wherein the support tube (101) and the at least one inner tube (103) include respective front tube ports in communication with a fluid passage in an electric energy application device assembly (108) supported by the support tube (101) and/or a heat dissipater (104) of the electric energy device assembly (108); and at least one fluid pump (105) installed in the exterior or interior fluid paths of the at least one inner tube (103) to control a flow direction of the heat transfer fluid in the fluid circulation path, wherein the fluid passage in the electric energy application device assembly (108) supported by the support tube (101), and/or the fluid passage of a heat dissipater (104) of the electric energy application device assembly (108), has at least one of the following configurations:

(a) an interior of the electric energy application device assembly (108) includes at least one heat transfer fluid path (1081) that extends through or past the electric energy application device assembly (108) from said front tube port of the at least one inner tube (103) to the front tube port of the support tube (101), (b) the heat dissipater (104) includes at least one heat transfer fluid path (1041) that extends through or past the heat dissipater structure from said front tube port of the at least one inner tube (103) to the front tube port of the support tube (101),
(c) the at least one heat transfer fluid path of the electric energy application device assembly (108) is connected to the at least one heat transfer fluid path (1041) of the heat dissipater, and the respective at least one heat transfer fluid paths (1081, 1041) of the electric energy application device (108) and heat dissipater (104) are connected to the respective front tube ports of the at least one inner tube (103) and support tube (101),
(d) the electric energy application device assembly (108) includes at least two internal heat transfer fluid paths (1081), or a U-shaped or L-shaped internal fluid path, connected through external tubes to form a fluid inlet port and a fluid outlet port respectively connected to the front tube ports of the at least one inner tube (103) and support tube (101),
(e) an exterior of the electric energy application device (108) is enclosed within a sealed housing, thereby forming a space between the electric energy application device (108) and the sealed housing to allow fluid to pass, said space being in communication with the front tube ports of the at least one inner tube (103) and the support tube (101) through at least one fluid inlet/outlet port,
(f) a sealed space allowing passage of the heat transfer fluid is formed between the electric energy application device assembly (108), the heat dissipater (104), and a housing of the electric energy application assembly (108) and the heat dissipater, said sealed space being in communication with the front tube ports of the at least one inner tube (103) and the support tube (101) through at least one fluid inlet/outlet port, and
(g) a sealed space allowing passage of the heat transfer fluid is jointly formed by a matched housing and an exterior of the electric energy application device assembly (108) and/or the heat dissipater (104), and the electric energy application device assembly (108) and/or the heat dissipater (104) includes at least one heat transfer fluid path, one end of which is formed with a heat transfer fluid connection port connected to the front tube port of the at least one inner tube (103) and a second end of which is formed with a heat transfer fluid connection port in communication with the sealed space, the sealed space being in communication with the front port of the support tube (101) via a heat transfer fluid connection port of the sealed housing,
wherein the support tube (101) is divided into an upper tube body, a middle tube body, and a lower tube body,
wherein the electric energy application device assembly (108) is installed on the upper tube body,
wherein the middle tube body provides support and passage of thermal energy,
wherein the lower tube body is installed in a natural thermal energy body (100), and
wherein the at least one inner tube (103) only extends through upper and middle portions of the support tube (101), and not into a lower portion of the support tube (101) that extends into the natural thermal energy body (100).

2. A heat-dissipating structure with internally recycling heat transfer fluid as claimed in claim 1, wherein the electric energy application device assembly (108) includes at least one of an illumination device, a photovoltaic or photoelectric generator device, a wind or liquid powered generator, a transformer, and electrical motor.

3. A heat-dissipating structure with internally recycling heat transfer fluid as claimed in claim 2, wherein the electric energy application device assembly (108) further includes at least one of a peripheral device, a control circuit device, an overload protection device, and a temperature protection device.

4. A heat-dissipating structure with internally recycling heat transfer fluid as claimed in claim 2, wherein the electric energy application device assembly (108) includes an illumination device (109) comprising at least one of a gaseous lamp and a solid state LED or OLED.

5. A heat-dissipating structure with internally recycling heat transfer fluid as claimed in claim 4, wherein the electric energy application device assembly (108) further includes a transparent member (1061) and at least one of a display screen, a billboard, and a signal or warning sign operated through the light output by the illumination device (109).

6. A heat-dissipating structure with internally recycling heat transfer fluid as claimed in claim 4, further comprising an electric controlling device (112) for controlling an input voltage, input current, and working temperature of the illumination device (109), and to control operation timing of the at least one fluid pump (105).

7. A heat-dissipating structure with internally recycling heat transfer fluid as claimed in claim 4, further comprising a temperature protecting device (102) including at least one of an electromechanical thermally actuated switch; a fuse; and a solid-state temperature detecting unit or temperature switch for terminating or partially terminating operation of the illumination device or supply of electricity, or to control the at least one fluid pump (105), in response to a temperature abnormality.

8. A heat-dissipating structure with internally recycling heat transfer fluid as claimed in claim 1, wherein the natural thermal energy body is one of an external gaseous, solid, and liquid environment.

9. A heat-dissipating structure with internally recycling heat transfer fluid as claimed in claim 1, wherein the natural thermal energy body is one of a shallow soil layer and a liquid body.

10. A heat-dissipating structure with internally recycling heat transfer fluid as claimed in claim 1, further comprising at least one additional said fluid pump (105) arranged in series with the at least one fluid pump (105).

11. A heat-dissipating structure with internally recycling heat transfer fluid as claimed in claim 1, wherein a flow direction of the heat transfer fluid is arranged to be switched or periodically changed.

12. A heat-dissipating structure with internally recycling heat transfer fluid as claimed in claim 1, wherein the heat dissipater (104) includes at least one heat transfer fluid path (1041) that extends through or past the heat dissipater structure from said front tube port of the at least one inner tube (103) to the front tube port of the support tube (101).

13. A heat-dissipating structure with internally recycling heat transfer fluid as claimed in claim 1, wherein an exterior of the electric energy application device (108) is enclosed within a sealed housing, thereby forming a space between the electric energy application device (108) and the sealed housing to allow fluid to pass, said space being in communication with the front tube ports of the at least one inner tube (103) and the support tube (101) through at least one fluid inlet/outlet port.

14. A heat-dissipating structure with internally recycling heat transfer fluid as claimed in claim 1, wherein a sealed space allowing passage of the heat transfer fluid is formed between the electric energy application device assembly (108), the heat dissipater (104), and a housing of the electric energy application assembly (108) and the heat dissipater (104), said sealed space being in communication with the front tube ports of the at least one inner tube (103) and the support tube (101) through at least one fluid inlet/outlet port.

15. A heat-dissipating structure with internally recycling heat transfer fluid as claimed in claim 1, wherein a sealed space allowing passage of the heat transfer fluid is jointly formed by a matched housing and an exterior of the electric energy application device assembly (108) and/or the heat dissipater, and the electric energy application device assembly (108) and/or the heat dissipater (104) includes at least one heat transfer fluid path, one end of which is formed with a heat transfer fluid connection port connected to the front tube port of the at least one inner tube (103) and a second end of which is formed with a heat transfer fluid connection port in communication with the sealed space, the sealed space being in communication with the front port of the support tube (101) via a heat transfer fluid connection port of the sealed housing.

16. A heat-dissipating structure with internally recycling heat transfer fluid as claimed in claim 1, wherein the support tube (101) is installed with heat transfer fins (2001) that extend from an exterior of the support tube (101).

17. A heat-dissipating structure with internally recycling heat transfer fluid as claimed in claim 1, wherein the at least one inner tube (103) is made of a rigid material.

18. A heat-dissipating structure with internally recycling heat transfer fluid as claimed in claim 17, wherein the at least one inner tube (103) is made of metal.

19. A heat-dissipating structure with internally recycling heat transfer fluid as claimed in claim 1, wherein the at least one inner tube (103) is made of a deformable or flexible material.

20. A heat-dissipating structure with internally recycling heat transfer fluid as claimed in claim 1, wherein the at least one inner tube (103) is made of a thermally insulating material.

21. A heat-dissipating structure with internally recycling heat transfer fluid as claimed in claim 1, wherein the at least one inner tube (103) is made of a thermally conductive material and an interior or exterior of the at least one inner tube (103) is provided with an insulating material.

22. A heat-dissipating structure with internally recycling heat transfer fluid as claimed in claim 1, wherein the at least one inner tube (103) is made of a thermally conductive material.

23. A heat-dissipating structure with internally recycling heat transfer fluid as claimed in claim 1, wherein the at least one inner tube (103) and the support tube (101) are concentric.

24. A heat-dissipating structure with internally recycling heat transfer fluid as claimed in claim 2, wherein the electric energy application device assembly (108) is a photovoltaic device (110) for converting light into electrical energy.

25. A heat-dissipating structure with internally recycling heat transfer fluid as claimed in claim 24, further comprising an electric controlling device (112) for controlling an output voltage, current, and working temperature of the illumination device, and to control operation timing of the at least one fluid pump (105).

26. A heat-dissipating structure with internally recycling heat transfer fluid as claimed in claim 24, further comprising a temperature protecting device (102) including at least one of an electromechanical thermally actuated switch; a fuse; and a solid-state temperature detecting unit or temperature switch for terminating or partially terminating operation of the illumination device or supply of electricity, or to control the at least one fluid pump (105), in response to a temperature abnormality.

27. A heat-dissipating structure with internally recycling heat transfer fluid as claimed in claim 2, wherein the at least one electric energy application device assembly (108) is a wind power generating device (111) including turbine blades and a generator (222).

28. A heat-dissipating structure with internally recycling heat transfer fluid as claimed in claim 27, further comprising an electric controlling device (112) for controlling an output voltage, current, and working temperature of the wind power generating device (111), and to control operation timing of the at least one fluid pump (105).

29. A heat-dissipating structure with internally recycling heat transfer fluid as claimed in claim 27, further comprising a temperature protecting device (102) including at least one of an electromechanical thermally actuated switch; a fuse; and a solid-state temperature detecting unit or temperature switch for terminating or partially terminating operation of the illumination device or supply of electricity, or to control the at least one fluid pump (105), in response to a temperature abnormality.

30. A heat-dissipating structure with internally recycling heat transfer fluid as claimed in claim 2, wherein the at least one electric energy application device assembly (108) includes a transformer (444).

31. A heat-dissipating structure with internally recycling heat transfer fluid as claimed in claim 30, wherein the transformer (444) is installed on the support tube (101) through a transformer support rack (445).

32. A heat-dissipating structure with internally recycling heat transfer fluid as claimed in claim 30, further comprising an electric controlling device (112) for controlling an output voltage, current, and working temperature of the transformer (444), and to control operation timing of the at least one fluid pump (105).

33. A heat-dissipating structure with internally recycling heat transfer fluid as claimed in claim 30, further comprising a temperature protecting device (102) including at least one of an electromechanical thermally actuated switch; a fuse; and a solid-state temperature detecting unit or temperature switch for terminating or partially terminating operation of the illumination device or supply of electricity, or to control the at least one fluid pump (105), in response to a temperature abnormality.

34. A heat-dissipating structure with internally recycling heat transfer fluid as claimed in claim 2, wherein the at least one electric energy application device assembly (108) includes an AC or DC electric motor (333).

35. A heat-dissipating structure with internally recycling heat transfer fluid as claimed in claim 34, further comprising an electric controlling device (112) for controlling an input voltage, current, and working temperature of the motor (333), and to control operation timing of the at least one fluid pump (105).

36. A heat-dissipating structure with internally recycling heat transfer fluid as claimed in claim 34, further comprising a temperature protecting device (102) including at least one of an electromechanical thermally actuated switch; a fuse; and a solid-state temperature detecting unit or temperature switch for terminating or partially terminating operation of the illumination device or supply of electricity, or to control the at least one fluid pump (105), in response to a temperature abnormality.

37. A heat-dissipating structure with internally recycling heat transfer fluid as claimed in claim 1, wherein the interior of the electric energy application device assembly (108) includes said at least one heat transfer fluid path (1081) that extends through or past the electric energy application device assembly (108) from said front tube port of the at least one inner tube (103) to the front tube port of the support tube (101).

38. A heat-dissipating structure with internally recycling heat transfer fluid as claimed in claim 37, wherein said heat dissipater (104) includes two said heat transfer fluid paths (1041) connected at distal ends by a U-shaped connecting tube (1042).

39. A heat-dissipating structure with internally recycling heat transfer fluid as claimed in claim 1, wherein the at least one heat transfer fluid path (1081) of the electric energy application device assembly (108) is connected to the at least one heat transfer fluid path (1041) of the heat dissipater (104), and the respective at least one heat transfer fluid paths (1081,1041) of the electric energy application device (108) and heat dissipater (104) are connected to the respective front tube ports of the at least one inner tube (103) and support tube (101).

40. A heat-dissipating structure with internally recycling heat transfer fluid as claimed in claim 1, wherein the electric energy application device assembly (108) includes at least two internal heat transfer fluid paths (1081), or a U-shaped or L-shaped internal fluid path, connected through external tubes to form a fluid inlet port and a fluid outlet port respectively connected to the front tube ports of the at least one inner tube (103) and support tube (101).

41. A heat-dissipating structure with internally recycling heat transfer fluid as claimed in claim 1, further comprising at least one second said electric energy application device assembly (108).

42. A heat-dissipating structure with internally recycling heat transfer fluid as claimed in claim 1, wherein the at least one inner tube (103) and support tube (101) are parallel and eccentrically arranged.

43. A heat-dissipating structure with internally recycling heat transfer fluid as claimed in claim 1, wherein the at least one inner tube (103) includes two parallel inner tubes (103).

44. A heat-dissipating structure with internally recycling heat transfer fluid as claimed in claim 1, wherein the at least one inner tube (103) is coaxial with the support tube (101), and further comprising a spiral flow guiding structure (2003) extending between the at least one inner tube (103) and the support tube (101).

* * * * *